United States Patent
Hutchison et al.

(10) Patent No.: US 6,728,486 B1
(45) Date of Patent: Apr. 27, 2004

(54) COMMUNICATION SYSTEM AND METHOD WITH OPTICAL MANAGEMENT BUS

(75) Inventors: Jerry D. Hutchison, Littleton, MA (US); Bruce D. Miller, North Reading, MA (US)

(73) Assignee: Alcatel Communications, Inc., Plano, TX (US)

( * ) Notice: Subject to any disclaimer, the term of this patent is extended or adjusted under 35 U.S.C. 154(b) by 423 days.

(21) Appl. No.: 09/590,950

(22) Filed: Jun. 9, 2000

Related U.S. Application Data

(60) Provisional application No. 60/138,222, filed on Jun. 9, 1999, and provisional application No. 60/141,398, filed on Jun. 29, 1999.

(51) Int. Cl.[7] ............................................. H04J 14/02
(52) U.S. Cl. ........................... 398/83; 398/79; 398/82; 398/84; 398/91; 398/59; 398/60; 398/68; 398/70; 398/71; 398/73; 398/74
(58) Field of Search ........................... 398/79, 82, 83, 398/84, 91, 59, 60, 68, 70, 71, 73, 74

(56) References Cited

U.S. PATENT DOCUMENTS

| | | | |
|---|---|---|---|
| 5,532,864 A | 7/1996 | Alexander et al. | 359/177 |
| 5,687,014 A * | 11/1997 | Czerwiec et al. | 359/123 |
| 5,748,350 A | 5/1998 | Pan et al. | 359/130 |
| 5,778,118 A | 7/1998 | Sridhar | 385/24 |
| 5,786,914 A | 7/1998 | Fielding | 359/124 |
| 5,796,889 A | 8/1998 | Xu et al. | 385/24 |
| 5,798,855 A | 8/1998 | Alexander et al. | 359/177 |
| 5,808,763 A | 9/1998 | Duck et al. | 359/127 |
| 5,815,295 A | 9/1998 | Darcie et al. | 359/128 |
| 5,822,095 A | 10/1998 | Taga et al. | 359/127 |
| 5,835,517 A | 11/1998 | Jayaraman et al. | 372/50 |
| 5,880,864 A | 3/1999 | Williams et al. | 359/124 |
| 5,887,107 A | 3/1999 | Newman et al. | 385/137 |
| 5,889,904 A | 3/1999 | Pan et al. | 385/24 |
| 5,892,781 A | 4/1999 | Pan et al. | 372/6 |
| 6,314,102 B1 * | 11/2001 | Czerwiec et al. | 370/395 |
| 6,362,908 B1 * | 3/2002 | Kimbrough et al. | 359/163 |
| 6,493,117 B1 * | 12/2002 | Milton et al. | 359/124 |

FOREIGN PATENT DOCUMENTS

EP    0 905 936 A2    3/1999

OTHER PUBLICATIONS

The Evolution of DWDM, pp. 1–8, downloaded from http://www.ciena.com/news/dwdm.pdf.
Fundamentals of DWDM, pp. 1–10, downloaded from http://www.ciena.com/news/nlsum98sup.pdf.
Ramaswami, R., et al., "Optical Networks: A Practical Perspective", Morgan Kaufmann Publishers, Inc., pp. 107, 172, 1998.
Kaminow, Ivan P., et al., "Optical Fiber Telecommunications IIIA", Academic Press, pp. 561, 566, 569, 572, 579, 1997.

* cited by examiner

*Primary Examiner*—Leslie Pascal
*Assistant Examiner*—Hanh Phan
(74) *Attorney, Agent, or Firm*—Hamilton, Brook, Smith & Reynolds, PC; Jessica W. Smith; V. Lawrence Sewell

(57) ABSTRACT

A communication system includes plural nodes interconnected with an optical transmission medium capable of carrying plural bands of optical channels. A device at each node is coupled to the medium for dropping one or more bands, adding one or more bands, and passively transmitting other bands such that a pair of nodes can communicate directly using a band common to the respective bands. One band of the bands associated with each of a first set of nodes overlaps with one band of the bands associated with each of a second set of nodes. Multiple overlapping bands provide a high level of wavelength termination diversity. An optical management bus system and method connects plural hybrid optical/electrical cables between transmission equipment and optical modules which connect to network fibers to provide a set of electrical connections that can be used to determine optical interconnections in an optical shelf configuration. A particular optical module can be identified as the root of an optical branching tree at a node and thereby the unique termination point of a network fiber such that a physical fiber topology can be associated with the logical fiber topology.

11 Claims, 13 Drawing Sheets

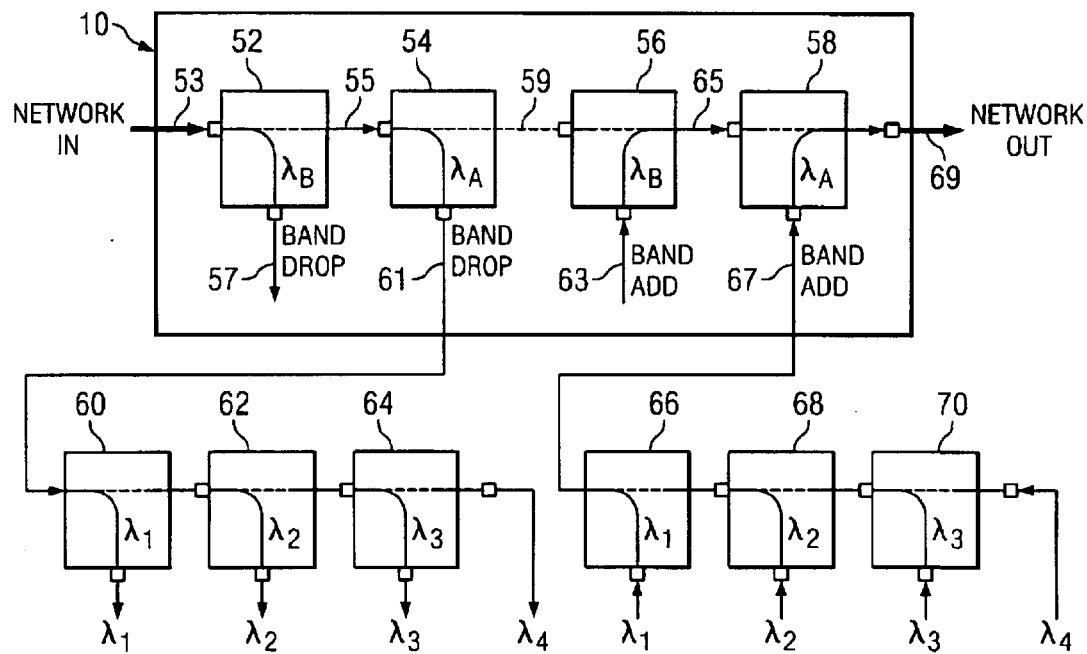
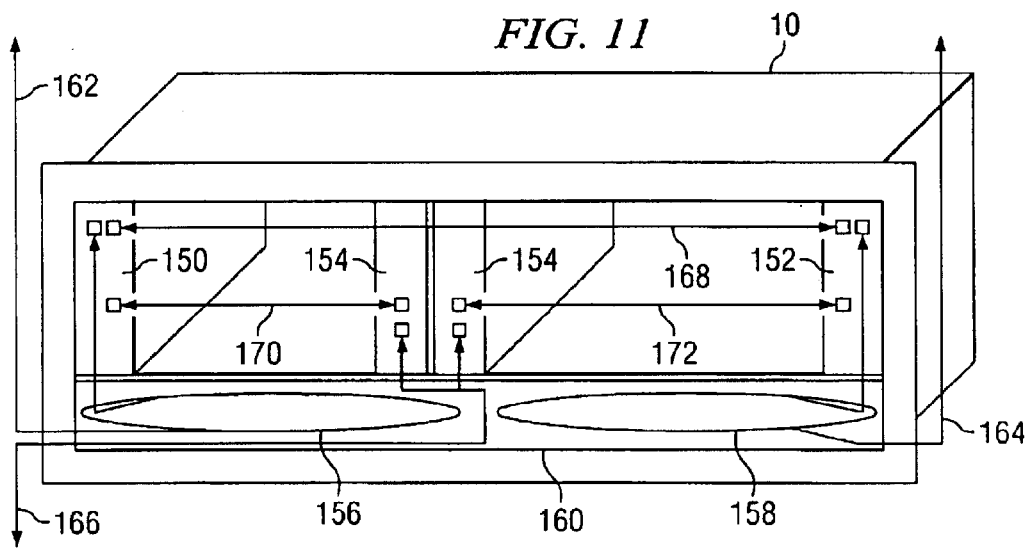

| FILTER TYPE | | FILTER CORNER WAVELENGTHS | | | |
|---|---|---|---|---|---|
| NAME | PASSBAND | ISOLATION L | PASSBAND L | PASSBAND H | ISOLATION H |
| A | 1529.55-1531.90 | 1527.326 | 1529.443 | 1532.008 | 1534.140 |
| B | 1534.25-1536.61 | 1532.008 | 1534.140 | 1536.719 | 1538.866 |
| C | 1538.98-1541.35 | 1536.719 | 1538.866 | 1541.459 | 1543.620 |
| D | 1543.73-1546.12 | 1541.459 | 1543.620 | 1546.229 | 1548.405 |
| E | 1548.51-1550.92 | 1546.229 | 1548.405 | 1551.028 | 1553.219 |
| F | 1553.33-1555.75 | 1551.028 | 1553.219 | 1555.857 | 1558.063 |
| G | 1558.17-1560.61 | 1555.857 | 1558.063 | 1560.716 | 1562.937 |
| H | 1563.05-1565.50 | 1560.716 | 1562.937 | 1565.606 | 1567.842 |

*FIG. 18A*
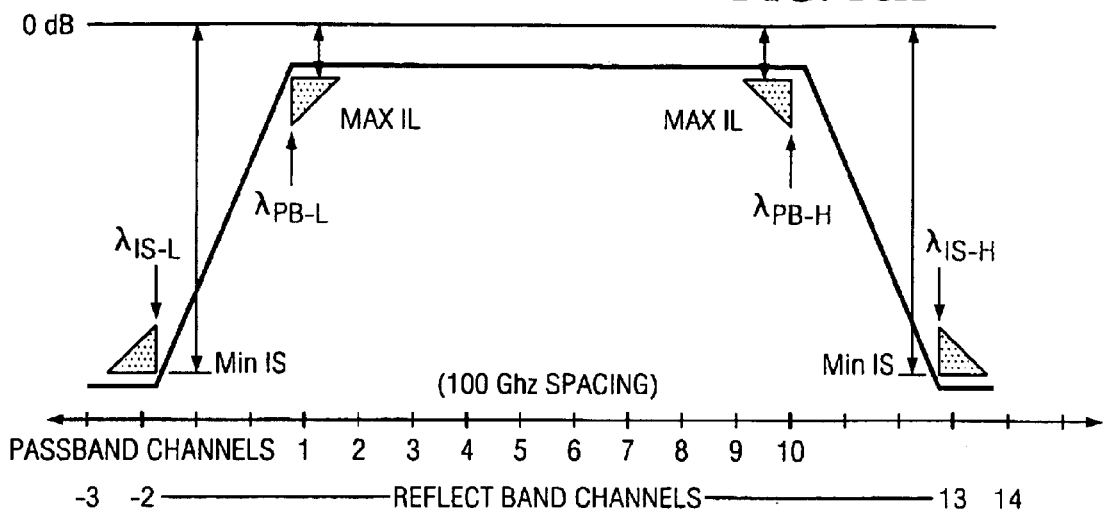
*FIG. 18B*
| FILTER TYPE | | FILTER CORNER WAVELENGTHS | | | |
|---|---|---|---|---|---|
| NAME | NOMINAL PASSBAND | ISOLATION L | PASSBAND L | PASSBAND H | ISOLATION H |
| AB | 1529.55-1536.61 | 1527.326 | 1529.443 | 1536.719 | 1538.866 |
| BC | 1534.25-1541.35 | 1532.008 | 1534.140 | 1541.459 | 1543.620 |
| EF | 1548.51-1555.75 | 1546.229 | 1548.405 | 1555.857 | 1558.063 |
| FG | 1553.33-1560.61 | 1551.028 | 1553.219 | 1560.716 | 1562.937 |
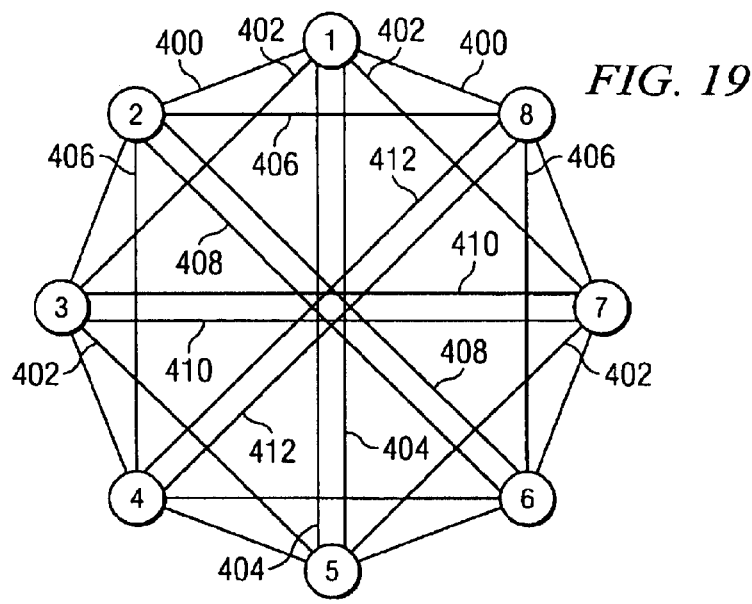
*FIG. 19*

COMMUNICATION SYSTEM AND METHOD WITH OPTICAL MANAGEMENT BUS

RELATED APPLICATIONS

This application claims the benefit of U.S. Provisional Application No. 60/138,222, filed Jun. 9, 1999, and U.S. Provisional Application No. 60/141,398, filed Jun. 29, 1999, and is related to co-pending application filed on even date, the entire teachings of which are incorporated herein by reference.

BACKGROUND

The emerging competitive metropolitan communications market has created a new set of challenges for carriers. Explosive demand for bandwidth together with regional fiber exhaustion is fueling the emergence of dense wavelength division multiplexing (DWDM) in metropolitan networks. Metropolitan DWDM networks require high levels of wavelength termination diversity, optical simplicity, low entry costs and unobtrusive network upgrades.

Traditional WDM approaches tailored to "long haul" networks address the network as a composite set of individually engineered wavelengths. Many WDM devices are passive devices. A lightpath is an optical carrier modulated with data for transport which is frequency multiplexed into the optical media with other lightpaths by the WDM device. There are typically two types of optical processing devices employed in such networks—large, fixed size add/drop multiplexers and cascaded, individual wavelength add/drop devices.

The large, fixed size add/drop multiplexer (FIG. 1) has relatively high cost but relatively low insertion loss. Because a large number of wavelengths are provisioned initially (greatly exceeding the initial need), future growth can be achieved without interruption by lighting up initially unused wavelengths. This type of device typically terminates or originates all of the wavelengths in a network fiber. Some wavelengths may still be implemented in a through path as shown for wavelengths $\lambda 1$, $\lambda 2$, $\lambda 3$ while other wavelengths are added or dropped as shown for wavelength $\lambda 8$. Larger devices having 16 to 32 ports are now typically available.

Individual wavelength add/drop devices can be cascaded as growth is required. Such an arrangement of devices is shown in FIG. 2. These devices typically have a through-path containing wavelengths not redirected by the cascaded devices. When cascaded at a node, the aggregate of cascaded devices quickly develops high insertion loss that is undesirable and costly to accommodate. The existing services often must be interrupted in order to provision new ones. A smaller number of wavelengths are selected in this type of network node than are typical in a node that uses the large, fixed size device of FIG. 1, therefore only half as many wavelengths are indicated.

Some networks use both approaches. The add/drop device of FIG. 1 is used at many points in such networks because of the need for growth allowance without future network disruptions. At the same time, limited deployment of the add/drop devices of FIG. 2 allows for low cost nodes that are unscalable.

In other optical networks, optical banding is used to drop a single band of wavelengths at a node and passively forward other bands through to the next node in the network. This approach provides for lower insertion loss in the optical through path. However, optical signal regeneration can still be required for connecting pairs of nodes separated by intervening nodes in certain network topologies.

WDM allows concurrent use of the same physical fiber by different signals on different wavelengths. A first division occurs between the two major windows of optical fiber: 1300 nm window, with laser operation commonly in the range of 1280 to 1350 nm; and 1550 nm window, with laser operation commonly in the range of 1530 to 1560 nm. These two windows provide a first level of multiplexing. Operation at multiple wavelengths is not common in the 1300 nm window as devices are often poorly controlled. However, within the 1550 nm window it is common to have 40 to 80 wavelengths (lightpaths).

The complexity of an optical network topology increases dramatically with the deployment of WDM and DWDM technology. Optical networks contain several to many nodes which can be interconnected into a ring (e.g., SONET ring) or a mesh topology. When WDM or DWDM is deployed, the actual logical interconnection of these nodes can be different than the physical cable topology. Complex optical configurations result and configuration information for the optical paths becomes very difficult to derive.

SUMMARY

There is a need to reduce optical losses in the through path of optical network configurations such that the use of optical regeneration is reduced or avoided.

There is also a need to provide information to a network management application to detect misconfigured networks and predict which lightpaths are co-resident in a single fiber.

Accordingly, a communication system includes plural nodes interconnected with an optical transmission medium capable of carrying plural bands of optical channels. A device at each node is coupled to the medium for dropping one or more bands, adding one or more bands, and passively transmitting other bands such that a pair of nodes can communicate directly using a band common to the respective bands. A node can communicate with multiple nodes using a single band element in its through path and at its location.

According to one aspect of the system, one band of the bands associated with each of a first set of nodes overlaps with one band of the bands associated with each of a second set of nodes. In a network configuration, adjacent nodes can communicate using an overlapping band. In another network configuration in which the nodes of the first set of nodes are non-adjacent to each other and the nodes of the second set of nodes are non-adjacent to each other, a node from the first set can communicate with a node from the second set using the overlapping band. The system can include multiple overlapping bands to provide a high level of wavelength termination diversity.

According to another aspect of the system, each node can include a first channel filter for separating at least one individual optical channel within the bands dropped by the device. Each node can further include a second channel filter or power coupler for adding at least one individual optical channel to the bands added by the device.

A method of the present approach includes providing plural nodes interconnected by an optical transmission medium capable of carrying plural bands of optical channels; at each node, dropping one or more bands, adding one or more bands, and passively transmitting other bands; and communicating between a pair of nodes using a band common to the respective bands.

It should be recognized that tradeoffs associated with an optical infrastructure can be dependent upon the physical network topologies. Optimizations can vary with different customer requirements and topologies. The overlapped optical banding of the present system and method provides improved optical performance by minimizing implementation costs with scalability, especially for entry-level configurations, and by minimizing optical losses in the through path to provide greater optical span length. A further benefit of the present approach is that incremental optical network bandwidth can be achieved without interruption of existing services. Applications of the present system and method with overlapped optical banding include ring and mesh topologies.

According to an optical management bus system and method, connection of plural hybrid optical/electrical cables between transmission equipment and optical devices which connect to network fibers provides a set of electrical connections that can be used to ascertain optical interconnections in an optical shelf configuration.

According to an aspect of the optical management bus approach, an optical module includes two electrical paths which are interconnected and a third electrical path isolated from the first two electrical paths. The electrical paths form electrical busses without stubs.

Memory devices each containing an identifier are connected to the electrically isolated busses within one optical module so that the information collected on the independent bus segments may be associated to provide a concise map of the optical interconnections and the order of interconnected optical modules to be ascertained. According to the present system and method, a particular optical module can be identified as the root of an optical branching tree at a node and thereby the unique termination point of a network fiber such that a physical fiber topology can be associated with the logical fiber topology.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 shows an optical shelf arrangement of optical band and optical filter devices.

FIG. 11 illustrates a physical configuration of an optical shelf.

FIG. 18A shows a characteristic curve of the dual band module component of FIG. 14A. FIG. 18B shows passband and corner point values associated with the characteristic curve of FIG. 18A.

FIG. 19 illustrates a large mesh network configuration using multiple dual bands.

DETAILED DESCRIPTION

The following terminology is used in the specification:

Band or Banded Set—a group of adjacent WDM optical channels that are multiplexed or demultiplexed together.

Channel—an identifier for an optical carrier frequency. The ITU defines a Channel as the third and fourth significant digits of the light frequency measured in Gigahertz, e.g., Channel 20 has an optical carrier at the frequency of 192,000 Ghz.

Coupler—a device for combining the signals of two or more fibers into one fiber. Most such devices are bidirectional and may be used for splitting a signal into two or more output fibers. Couplers can be wavelength selective or wavelength independent.

Erbium Doped Fiber Amplifier (EDFA)—a purely optical device (as opposed to electronic) for boosting an optical signal using a segment of specially composed, erbium doped fiber.

Lightpath—a waveguide for an optical signal spanning multiple fiber segments and branch points containing passive optical multiplexing components. A lightpath can include one or more EDFA components but does not include optical to electrical conversion elements.

Optical Bypass—propagation in a waveguide of a group of one or more optical signals beyond the point of exit or entry used by another group of optical signals.

Splitter—a device for splitting an optical signal from one fiber into two or more output fibers. Splitters can be wavelength selective or broadband devices.

Wavelength Division Multiplexing (WDM)—frequency-division multiplexing at optical carrier-wave frequencies, in which parallel data streams modulating light at different wavelengths (colors) are coupled simultaneously into the same fiber. Dense WDM (DWDM) is generally considered as multiplexing of wavelengths having 0.8 nm (100 Ghz) or less spacing.

Figure 3:
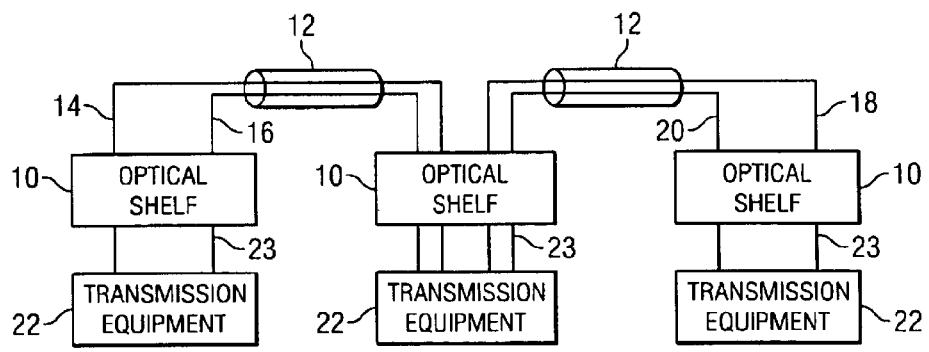
FIG. 3 illustrates a physical network topology for a portion of an optical work.

FIG. 3 illustrates a typical physical network topology for a portion of an optical network. One or more optical fiber cables 12, each containing multiple fibers 14, 16, 18, 20, connect between sites in the typical metropolitan area network. These long-distance fibers typically terminate at an optical shelf 10. Fiber in the metropolitan area is often terminated at an optical shelf due to the operational importance of the cable plant. The optical shelf is a chassis designed to help manage optical components and reduce interruptions of the network backbone connections. Transmission equipment 22, such as a SONET add/drop multiplexer, connect via optical jumper cables 23 to the optical shelf 10 so that actual reconfiguration of the backbone fiber is seldom needed.

In the past, network connections used the optical fibers as point-to-point links. Transmission equipment provided the only interconnection of non-adjacent nodes. For such point-to-point connections, a virtual circuit can be relayed through transmission equipment in several nodes en route to the destination equipment.

Wavelength division multiplexing is now employed in optical networks to provide features and benefits that include ease of provisioning new services over existing SONET infrastructures; increased connectivity beyond the limits of common rings; added connectivity between non-adjacent nodes in a network without commissioning new fibers; and increased fiber capacity.

Figure 4:
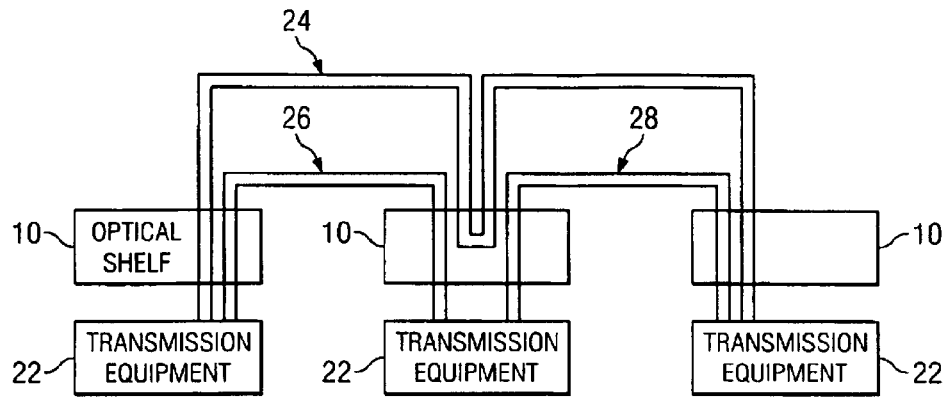
FIG. 4 illustrates a logical network topology for a portion of an optical network.

FIG. 4 illustrates a logical network topology for a portion of an optical network employing WDM. Individual lightpaths 24, 26, 28 are shown interconnecting the transmission equipment 22. In particular, lightpath 24 is configured over multiple physical cable segments so that non-adjacent nodes are directly connected.

Two concepts within WDM optical networks are "optical bypassing" and "optical banding". Optical bypassing is used to allow a lightpath to travel past or through several nodes (i.e., a through path) without conversion to an electrical signal, thus connecting non-adjacent nodes. Nodes operating in the 1550 nm window may bypass other nodes in the 1550 nm window and nodes in the 1300 nm window. Constraints or limits to optical bypassing include the laser launch power, receiver sensitivity, losses attributable to passive optics, losses due to fiber attenuation and crosstalk. For example, typical values for bypassing 1300 nm—only nodes (without 1550 nm window related components) are 8 hops for 1 Km separation between nodes and 3 hops for 40 Km separation between nodes. For bypassing 1550/1300 nodes, typical values are 4 hops for 1 Km separation between nodes and 3 hops for 10 Km between nodes.

Figure 5:
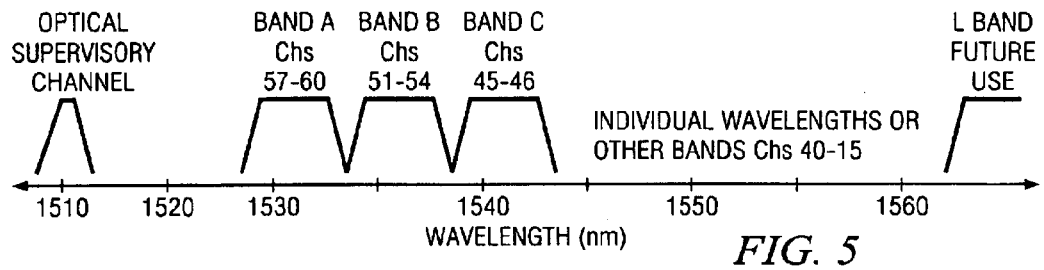
FIG. 5 shows an optical spectrum with optical bands.

The ITU-T Optical Grid supports roughly 40 channels in the 1530 to 1560 nm range based on 100 Ghz spacings. These channels can uniquely exist in each optical span. FIG. 5 shows a portion of these optical channels partitioned into "optical bands" A, B and C for use in the present approach. Each optical band shares a common optical path and enjoys a unique local set of connection rules as described further herein; however, the rules do not need to be common across all of the optical bands. Specifically, each optical band shares a common optical path such that every channel traverses the same set of "banding optics". In addition, each optical band has common channel spacing whereby every channel subscribes to the same channel spacing rules within the band.

The optical bands are specifically intended to provide the most important connections in a manner that significantly reduces cost, reduces the need to reconfigure the backbone network during channel adds and allows different optical technology to coexist in the optical infrastructure in different banded sets. The number of independently routed lightpaths at a particular node in the network is generally limited to the number of bands (e.g., eight bands). For most applications, the optical loss associated with bypassing itself precludes the use of more bands. For some applications the band restriction can be significant and limiting. As such, channels 15–40 and future channels in the L band are available for individual wavelength use or for other bands as described further herein. An optical supervisory channel is also shown located at 1510 nm in FIG. 5.

Figure 6:
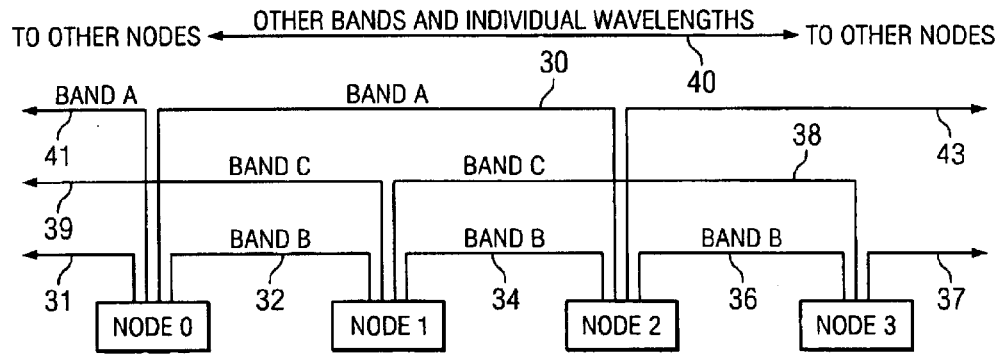
FIG. 6 illustrates a network topology for a portion of an optical network using optical bands and individual wavelengths for connectivity.

FIG. 6 illustrates a composite banded set/individual wavelength overlay in a portion of a WDM network. The network portion includes nodes designated node 0, node 1, node 2 and node 3. The connections are made according to particular rules as follows, though other connectivity rules are possible. Direct connection between each physically adjacent node is via band B. Thus, the band B connections include connection 32 between node 0 and node 1, connection 34 between node 1 and node 2, and connection 36 between node 2 and node 3. Additional band B connections 31, 37 exist to adjacent nodes not shown. Direct connection between even numbered neighbors (e.g., nodes 0 and 2 on connection 30) is via band A. Additional A band connections 41, 43 exist to other even numbered nodes not shown. Direct connection between odd numbered neighbors (e.g., node 1 and 3 on connection 38) is via band C. Additional C band connection 39 exists to another odd numbered node not shown. Direct connection between other combinations of nodes is made using other wavelengths or bands designated at 40.

Figure 7:
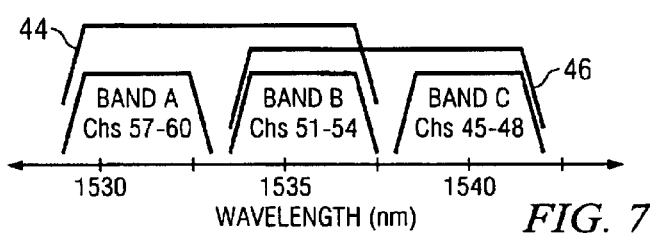
FIG. 7 shows passbands for dual optical band devices.

As described further herein, optical modules that provide add, drop or add/drop capabilities operate on the basis of a combination of the bands shown in FIGS. 5 and 6. As shown in FIG. 7, an AB bandpass optical module combines the A and B optical bands to provide an AB bandpass 44. Similarly, a BC bandpass optical module combines the B and C optical bands to provide a BC bandpass 46. The overlapping optical bands of the present approach reduces loss in the through path and allows increased bypassed-node count.

Referring now to FIG. 8, an optical shelf 10 at a node is shown with optical band devices 52, 54, 56, 58 and optical filters 60, 62, 64 and 66, 68, 70. The optical band devices 52, 54, 56, 58 are cascaded in the network through path between network input 53 and network output 69. The network input 53 connects the optical shelf 10 to an upstream node and the network output 69 connects the optical shelf to a downstream node. Optical band device 52 drops optical band B to line 57 and passes other channels through to optical band device 54 on line 55. Optical band device 54 drops optical band A to line 61 and passes other channels through to optical band devices 56, 58 on line 59. Optical band device 56 adds a signal at optical band B on line 63 to the through path on line 65. Finally, optical band device 58 adds a signal at optical band A on line 67 to the through path on line 69. Other optical shelf configurations can be provided that employ B and C band devices to provide similar functions for B and C bands.

By adding bands in the same order as they are dropped, the present system and method provide increased performance through equalization of losses between the bands and increased isolation between drop and add single band.

As new lightpaths are required, optical filters are added outside the through path. For example, optical filters 60, 62, 64 are connected in cascade to line 61 to separate out individual channels at respective wavelengths $\lambda 1, \lambda 2, \lambda 3, \lambda 4$ in the A band. Likewise, optical filters 66, 68, 70 are connected in cascade to line 67 to add individual channels at respective wavelengths $\lambda 1, \lambda 2, \lambda 3, \lambda 4$ in the A band. Additional lightpaths can be accommodated by connecting appropriate optical filters for wavelengths in the B band to line 57 and to line 63.

As noted above, the bands A, B, C accommodate the most important connectivity needs between adjacent or nearly adjacent nodes. The optical band devices can be installed in all typical network nodes. Future provisioning is done using the individual wavelength filter devices on an as-needed basis without interruption of the network through path. A specific need outside the provisioning of wavelength channels within the specified bands can be accommodated using individual wavelength add/drop devices (not shown) that are not generally populated within network nodes.

Figure 9:
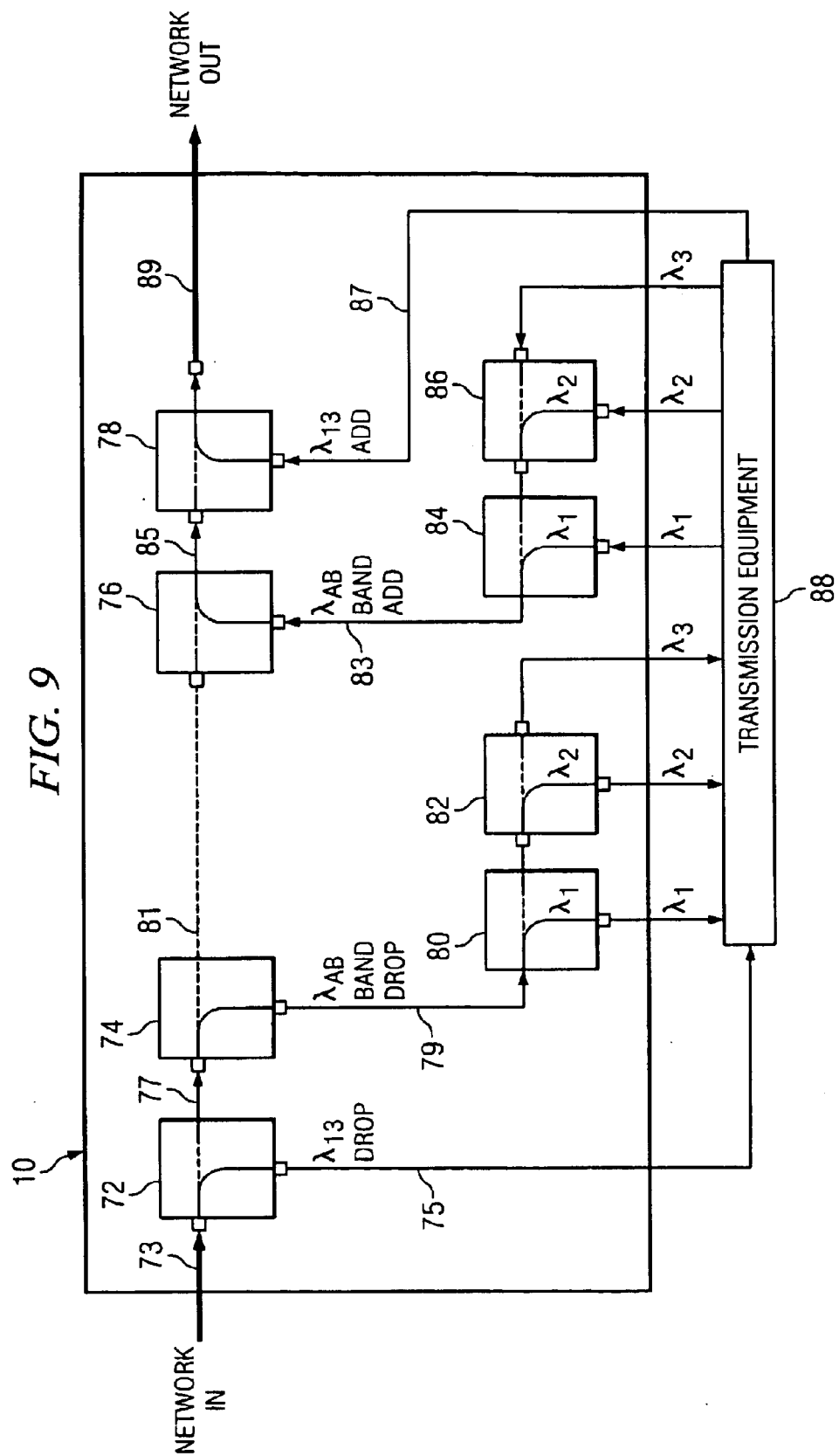
FIG. 9 shows an optical shelf arrangement of dual optical band devices and optical filter devices.

The configuration in FIG. 8 shows optical band devices as individual add or drop devices for each band A, B. However, as noted above with respect to FIG. 7, it is preferable to use devices that combine two or more bands, e.g., AB and BC bands to reduce insertion loss and allow increased optical bypass capability. FIG. 9 illustrates an optical shelf configuration in which optical band devices 74, 76 are used to respectively drop and add dual bands AB in the network through path. In particular, optical band device 74 drops optical band AB to line 79 and passes other channels through to optical band device 76 on line 81. Optical band device 76 adds a signal at optical band AB on line 83 to the through path on line 85. Other optical shelf configurations can be provided that employ BC band devices to provide similar functions for dual BC bands.

Figure 1:
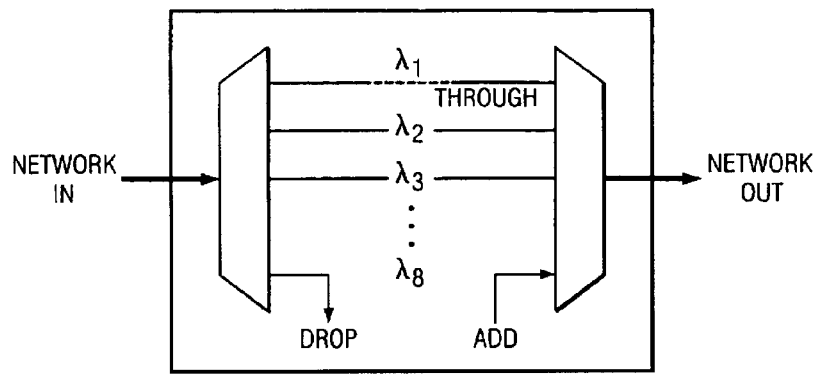
FIG. 1 illustrates an add/drop multiplexer of the prior art.

Similar to the operation described above regarding FIG. 8, optical filters are added outside the through path as new lightpaths are needed. However, in the configuration shown in FIG. 9, optical filters 80, 82 are connected in cascade to line 79 to separate out individual channels at respective wavelengths $\lambda 1, \lambda 2, \lambda 3$ in the AB band to connect to transmission equipment 88. Likewise, optical filters 84, 86 are connected in cascade to line 83 to add individual channels at respective wavelengths $\lambda 1, \lambda 2, \lambda 3$ in the AB band from transmission equipment 88. It should be noted that in alternate embodiments, the optical filters 80, 82 and 84, 86 can be implemented with a larger device using technologies such as those employed to build the device shown in FIG. 1.

The configuration in FIG. 9 also includes optical filters 72, 78 located in the through path for respectively dropping and adding signals at the 1300 nm window for use by the transmission equipment 88.

It should be noted that separation of drop devices from add devices as deployed in the present system improves performance. In particular, isolation is improved in two ways: 1) isolation within a band or wavelength for drop versus add, and 2) isolation between two wavelengths.

Another advantageous aspect of the present system is that the components initially deployed in a customer network are not obsoleted when the state of the art for WDM components progresses. Circa 1997, the best commercial devices provided 200 Ghz spacing of wavelengths. Today, commercial devices are available for 50 Ghz spacing. It can be seen that the band devices in the through path of the present system are compatible with both of these technologies.

Figure 2:
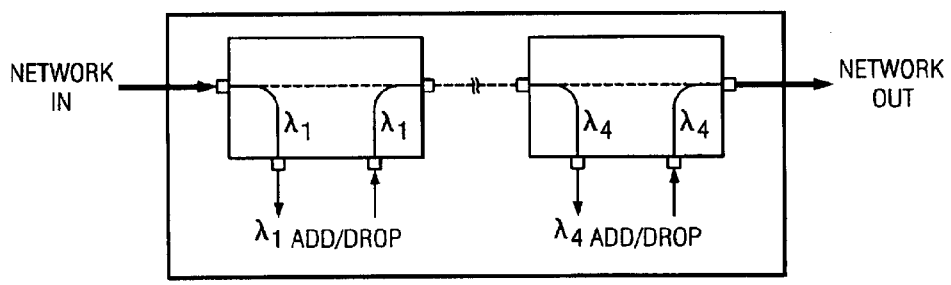
FIG. 2 illustrates a cascade of individual wavelength add/drop-devices of the prior art.

The through-path insertion loss for dropping and adding 1 to 8 wavelengths using the above approach is 0.8 db typical, 1.2 db maximum using components available from E-tek. It can be seen that the present system has much lower insertion loss than the two prior art designs described earlier. In addition, as the cost of the two optical devices used above are roughly ¼ that for a single-wavelength add-drop of a prior art design, it can be seen that the initial cost is low if only one wavelength is provisioned (i.e., only devices identified using a letter and no numbered devices are needed). The cost to provision 4 wavelengths is roughly the cost of two single wavelength add/drop devices as shown in the prior art device of FIG. 2.

While the add function in FIG. 9 is shown as being wavelength dependent, it should be understood that in alternate embodiments, the add function can be accomplished using wavelength independent power combiners at greatly reduced cost.

Multiple connections can be configured between nodes in an optical network to allow concurrent use of the fiber by multiple types of equipment, provide levels of protection against failures and to increase capacity. The following describes ways of constructing lightpaths on top of the physical cable plant for these purposes to provide fiber ring or fiber mesh network topologies.

It should be noted that circuits can be configured over lightpaths to provide another level of connectivity beyond what is described in this specification. The electrical switching of data by switch nodes allows circuits to be constructed using multiple lightpaths spanning more nodes than may be possible optically.

Figure 10:
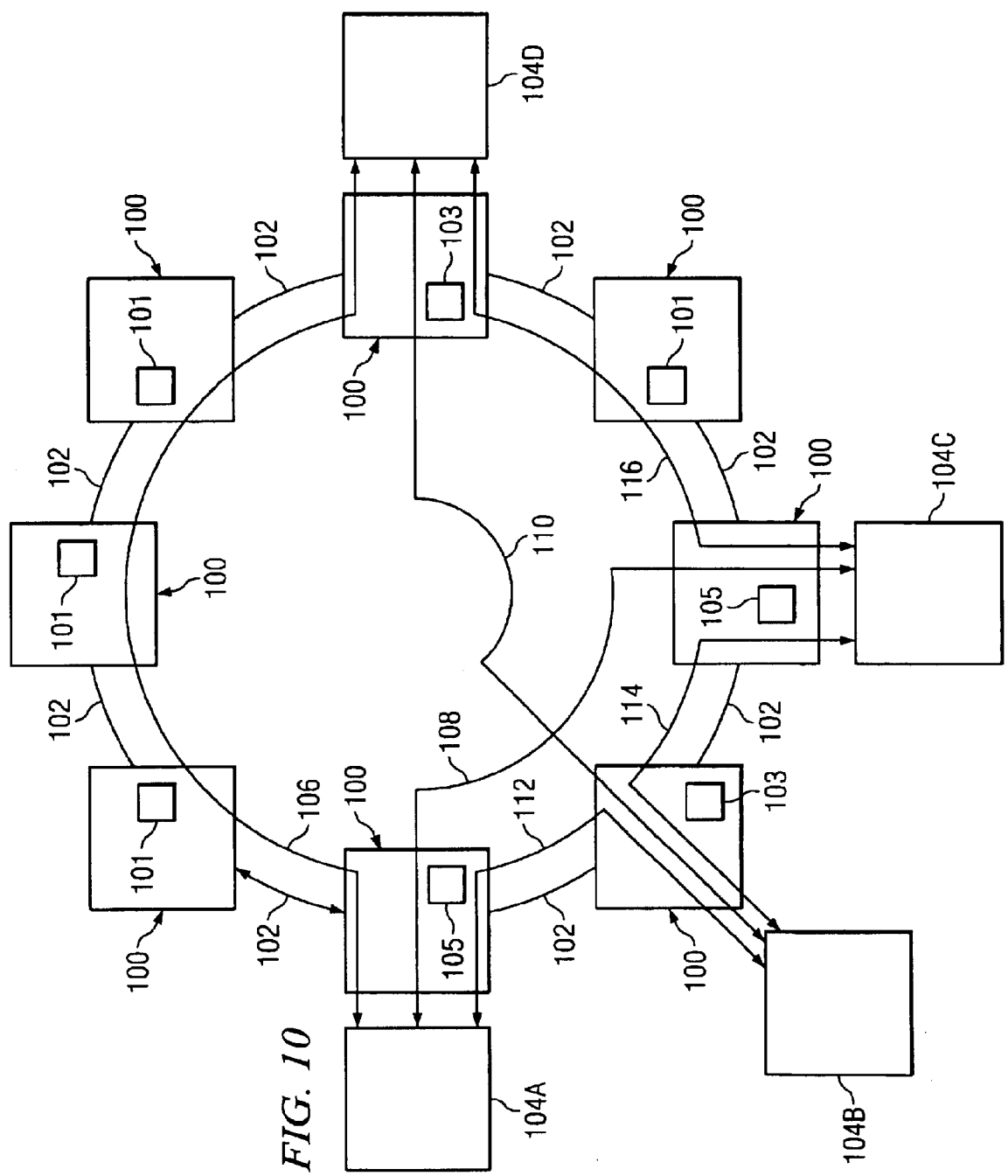
FIG. 10 illustrates an optical ring network with a WDM mesh overlay.

Referring now to FIG. 10, a SONET ring network with a WDM mesh overlay is shown. The ring network includes nodes 100 connected in a SONET ring. The physical cable plant for the ring is a set of point-to-point duplex optical connections 102 operating at the 1300 nm window. On the ring, data is received from one connection and repeated onto the next connection by the node 100 to allow logical connectivity between non-adjacent nodes 100. In addition, four nodes 104A, 104B, 104C, 104D are shown connected in a full mesh using duplex WDM lightpaths 106, 108, 110, 112, 114, 116 overlaid on the SONET ring fiber configuration.

At each site there are optical components designated 101, 103 and 105. At the nodes 100 that operate at the 1300 nm window, an optical coupler device 101 is used to tap off the 1300 nm channel while allowing the entire 1550 nm window to propagate through or past the node. At the nodes that include nodes 104B and 104D, optical band devices 103 are used to tap off the 1300 nm channel and add/drop the AB band while allowing other wavelengths in the 1550 nm window to propagate further. Likewise, at the nodes that include nodes 104A and 104C, optical band devices 105 are used to tap off the 1300 nm channel and add/drop the BC band while allowing other wavelengths in the 1550 nm window to propagate further.

Individual wavelength add/drop components could be used in the above mesh network or other ring networks; however, such deployment would generally only serve to increase cost and reduce flexibility. It should be noted, though, that a more complicated topology than shown above could require using additional bands.

Redundant connections with path diversity can be added to the configuration of FIG. 10 as follows. Node 104A is shown connected to node 104D via lightpath 106. A diverse fiber path would need to pass by node 104C but this area already utilizes the bands A, B and C. To accommodate this restriction, a band coupler, e.g., in the channel range of 22–40, can be configured at nodes 104A and 104D to operate a new lightpath between the nodes and passing by node 104C.

The previous example considered a physical ring topology with a WDM mesh overlay. It should be understood that the principles of the present approach can also be applied to other topologies including a mesh of physical fiber connections. The present approach also allows a set of lightpaths co-resident in one fiber segment in the mesh to be split into multiple fiber segments in other parts of the mesh topology.

A physical configuration of an optical shelf 10 is shown in FIG. 11. The shelf holds a plurality of optical modules containing passive WDM components (e.g., 1300 nm, 1550 banded and 1550 individual channel) and provides for fiber management as described further herein. The particular configuration shown includes add/drop modules 150, 152 that are located in the through path for the connected backbone network and receiver/transmit filter modules 154 that are not part of the through path. Note that additional optical modules can be added in the slots between modules 150 and 154 and between modules 154 and 152. Network cables 162, 164 connect to the add/drop modules 150, 152 through service loops 156, 158, respectively. A cable tray 160 located at the bottom of the shelf 10 houses and protects the service loop cables.

Connections are shown between modules within the optical shelf 10. Patch cable 168 connected between add/drop modules 150, 152 carries the through path connection of the backbone network. Patch cables 170, 172 connect the filter modules 154 to the respective add/drop modules 150, 152. Patch cable 166 connects between the filter modules 154 and local transmission equipment at the node (not shown).

Physically adding or removing add/drop modules 150, 152 generally requires breaking the backbone network through path. Such action can cause a global topology change or path protection event that can easily affect more than the single lightpath being modified. Network management tools may be required to temporarily reroute data traffic during such an operation to avoid customer perceived network outages. Since the filter modules 154 are not in the through path, such modules can be added, removed or moved while only affecting their own lightpath. In this way, new lightpaths can often be provisioned and new shelf components added without interrupting the operation of existing lightpaths.

Embodiments of different optical modules are now described. The module embodiments are configured for easy deployment and management of duplex connections on a two-fiber, bidirectional ring similar to a bidirectional line-switched ring (BLSR) topology. To avoid problems associated with unidirectional path switched ring (UPSR)-like topologies, the transmit and receive lightpaths of a connection are set in the same direction, e.g., west or east. The transmit and receive lightpaths are on two different fibers and can use the same wavelength or band. A wavelength or band of wavelengths that is dropped/added in one direction (e.g., west) is preferably dropped/added in the other direction (e.g., east) to make the most efficient use of the fiber bandwidth. The following description is provided in relation to west-oriented modules.

Figure 12A:
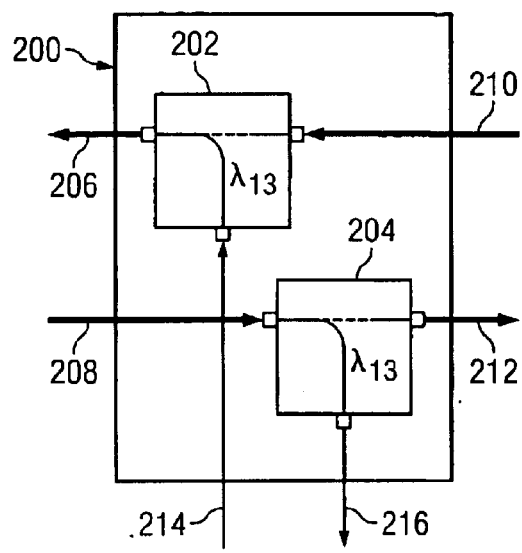
FIGS. 12A and 12B illustrate respective functional and physical views of a 1310 nm add/drop module.

FIG. 12A shows a 1310 nm add/drop module 200 which can be used to provide a through path at network nodes which do not originate or terminate wavelengths in the 1500 nm window. For example, if a network node contained only legacy equipment operating at 1310 nm, the module 200 allows other nodes that use the 1500 nm window to connect through that node.

Figure 12B:
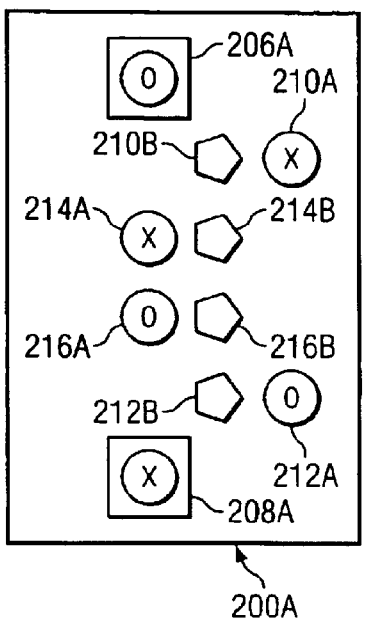

The add/drop module 200 includes add component 202 and drop component 204. In the through path the module includes network output 206, network input 208, through path input 210, through path output 212. The module also includes 1310 nm add input 214 and 1310 nm drop output 216. A physical view 200A of the interfaces to and from the module 200 is shown in FIG. 12B. Customer specified connectors (or fiber pigtails for splicing) 206A, 208A are used to connect into the network backbone fiber and can include FC, SC, ST or other type optical connector. Interfaces connecting to other optical shelf modules or to attached transmission equipment are type SC optical connectors. Note that the designated interfaces in FIG. 12B correspond to the inputs and outputs in FIG. 12A by corresponding number followed by the letter "A". For example, interface 206A corresponds to the network output 206. The circles with an "o" designation indicate outputs while the circles with an "x" designation indicate inputs.

A management interface is provided on each module which operates using secondary power supplied through a management data bus connection as described further herein. These electrical jack interfaces are shown in FIG. 12B with corresponding numbers followed by the letter "B". For example, the management interface for add input 214 is designated 214B.

Figure 13A:
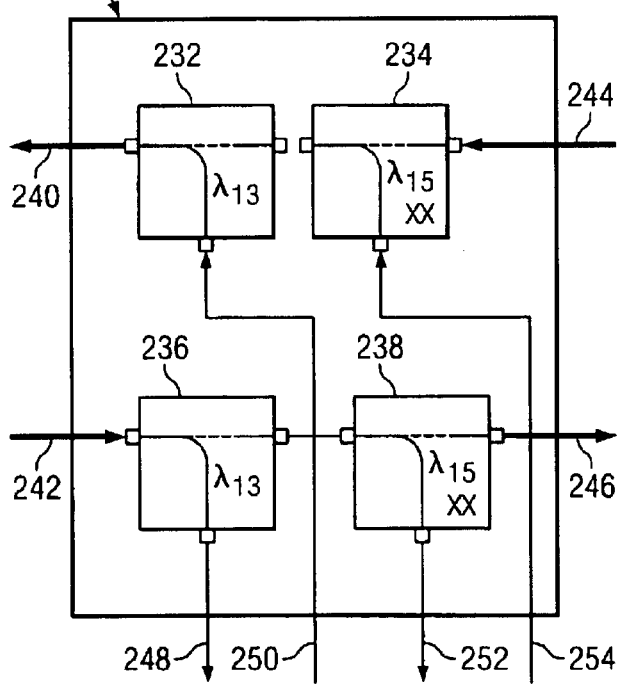
FIGS. 13A and 13B illustrate respective functional and physical views of a 1310 nm /1500 nm band add/drop module.

FIG. 13A shows a 1310 nm/1500 nm band add/drop module 230 which can be used to terminate a network fiber at a node in which transmission equipment operates with WDM interfaces or where traffic growth is anticipated.

The module 230 includes respective 1310 nm and 1500 nm band add components 232, 234 and respective 1310 nm and 1500 nm band drop components 236, 238. The "15xx" designation is used to indicate that the module operates on one of the bands A, B, C or other band. In the through path the module includes network output 240, network input 242, through path input 244, through path output 246. The module also includes 1310 nm add input 250, 1310 nm drop output 248, 1500 nm band add input 254 and 1500 nm band drop output 252.

Figure 13B:
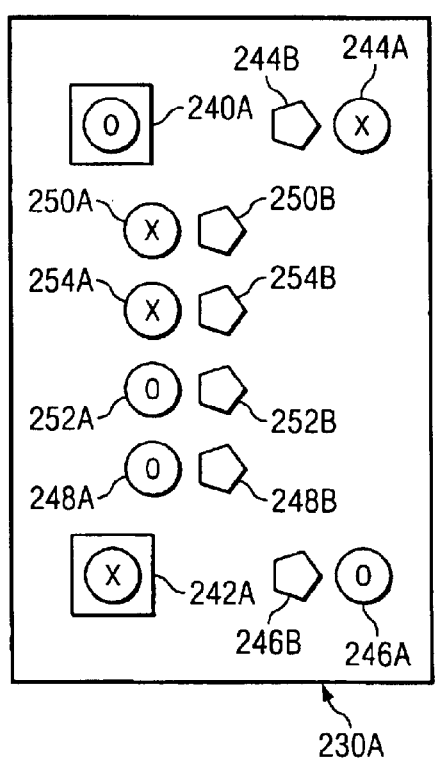

A physical view 230A of the interfaces to and from the module 230 is shown in FIG. 13B. Customer specified connectors 240A, 242A are used to connect into the network backbone fiber. Note that the designated interfaces in FIG. 13B correspond to the inputs and outputs in FIG. 13A by corresponding number followed by the letter "A". For example, interface 240A corresponds to the network output 240. Electrical jack interfaces are shown in FIG. 13B with corresponding numbers followed by the letter "B". For example, the management interface for 1500 nm band add input 254 is designated 254B.

Figure 14A:
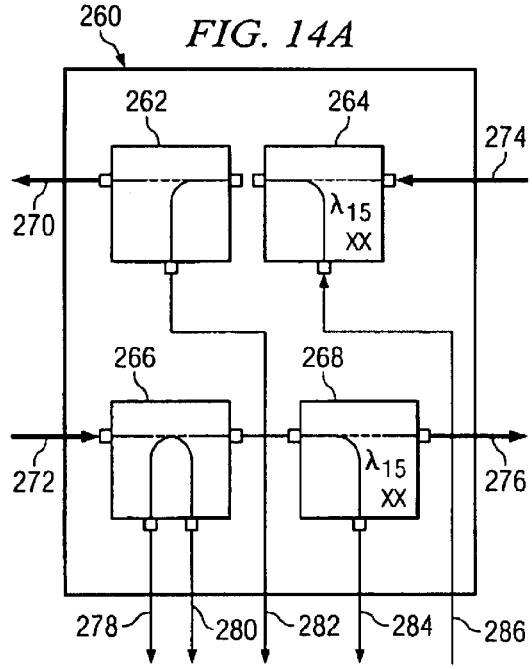
FIGS. 14A and 14B illustrate respective functional and physical views of a 1500 nm band add/drop module.

FIG. 14A shows a 1500 nm band add/drop module 260 which can be used to terminate a network fiber at a node in which transmission equipment operates with WDM interfaces and the 1310 nm wavelength is not needed. A module of this type can be used to provide additional bands of channel capacity at nodes in conjunction with module 230 (FIG. 13A). The module is shown designated for dual bands AB, though other similar modules provide operation for dual bands BC or other multiple bands.

The module 260 includes 1500 nm band add component 264 and 1500 nm band drop component 268. In the through path the module includes network output 270, network input 272, through path input 274, through path output 276. The module also includes 1500 nm band add input 286 and 1500 nm band drop output 284.

The module 260 also includes monitor components 262, 266 with outputs 278, 280, 282 which are used to monitor lightpaths passing through the module while the network is operational. The monitor outputs 278, 280 are used to monitor the network input 272. Monitor output 280 provides a copy of the lightpaths in the 1500 nm window which are 20 dB attenuated from the live fiber traffic on the network input 272.

This port can be monitored with a wavelength meter or an optical spectrum analyzer with a noise floor below −30 dBm. Monitor output 278 is a directionally coupled port that provides a −20 dB copy of the signal propagating backwards out of the network input 272. Normally, there should be very little light power available at output 278. The power measured at output 278 should be 20 dB below that which is measured on the network input monitor port 280. Any significant power generally means that there is a faulty connection in the optical shelf modules and components. Monitor output 282 provides a copy of the lightpaths in the 1500 nm window which are 20 dB attenuated from the live traffic on the network output 270. This monitor output can be used to verify that the expected optical channels are active at this point in the optical shelf.

It should be understood that the preceding monitor components can also be incorporated in the modules 200 (FIG. 12A) and 230 (FIG. 13A) described above.

Figure 14B:
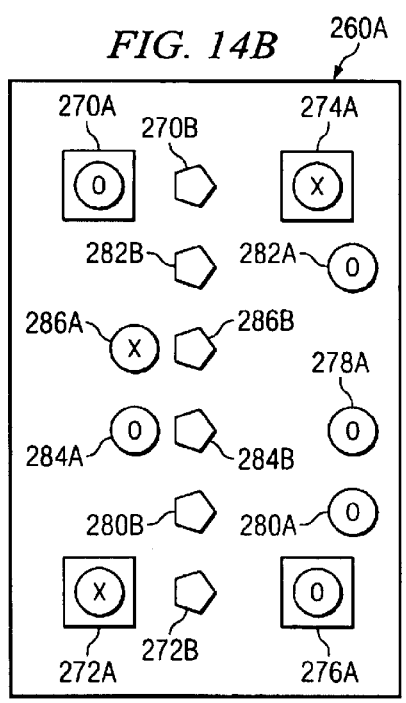

A physical view 260A of the interfaces to and from the module 260 is shown in FIG. 14B with interface designations corresponding to inputs and outputs in FIG. 14A. Electrical jack interfaces are shown in FIG. 14B with corresponding numbers followed by the letter "B". For example, the management interface for 1500 nm band add input 286 is designated 286B.

Figure 14C:
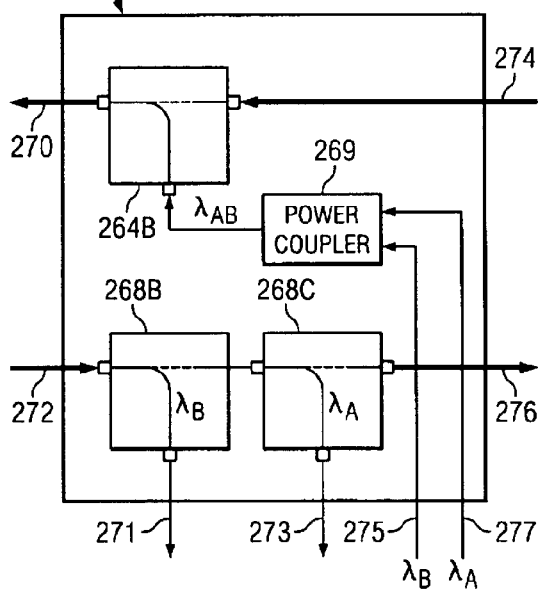
FIG. 14C illustrates an alternate embodiment of the 1500 nm band add/drop module.

An alternate embodiment of a 1500 nm band add/drop module is shown in FIG. 14C. The module 260B includes separate cascaded A and B band drop components 268C, 268B. On the add side, the module 260B includes a power coupler 269 which combines signals at bands A and B for adding to coupler 264B. In the through path the module includes network output 270, network input 272, through path input 274, through path output 276. The module also includes B band drop output 271, A band drop output 273, B band add input 275 and A band add input 277. Similar modules can be provided for operation with bands B and C or other bands.

Outside the network through path, filter modules can be added to further separate added or dropped bands of wavelengths (e.g., A, B and C bands) into individual wavelength channels at spacing of, e.g., 200 Ghz, 100 Ghz or 50 Ghz.

Figure 15A:
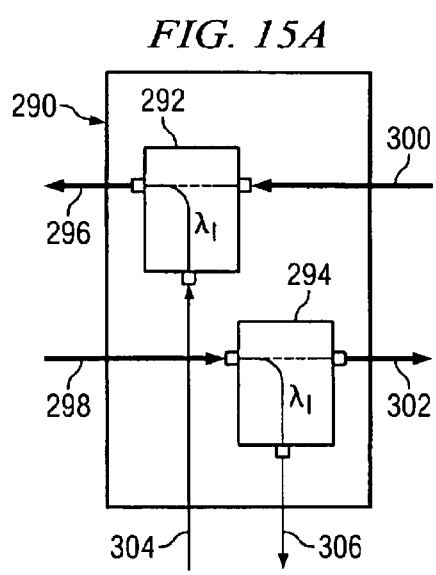
FIGS. 15A and 15B illustrate respective functional and physical views of a single wavelength filter module.
Figure 15B:
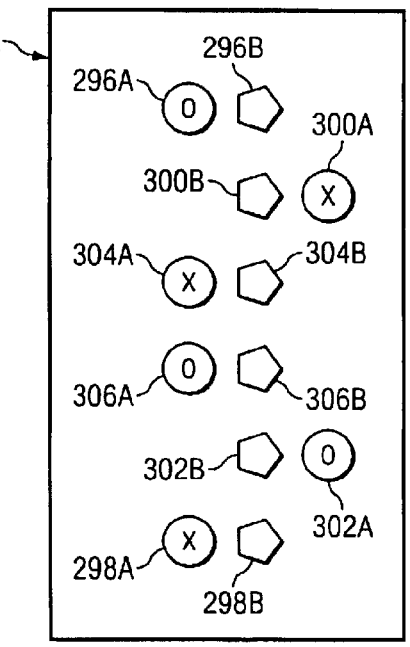

FIG. 15A shows a single wavelength filter module 290 which includes add component 292 and drop component 294 for adding and dropping a single wavelength in the 1500 nm window designated λI. The module includes transmit common output 296, receive common input 298, transmit expansion input 300, receive expansion output 302, λI add input 304 and λI drop output 306. A physical view 290A of the interfaces to and from the module 290 is shown in FIG. 15B with interface designations corresponding to inputs and outputs in FIG. 15A. Electrical jack interfaces are shown in FIG. 15B with corresponding numbers followed by the letter "B". For example, the management interface for λI add input 304 is designated 304B.

Figure 16A:
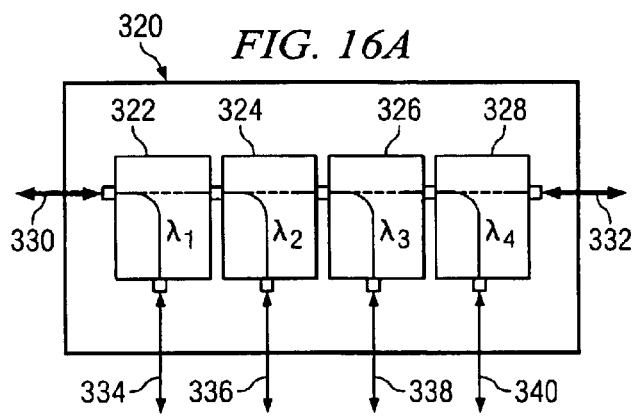
FIGS. 16A and 16B illustrate respective functional and physical views of a four wavelength filter module.
Figure 16B:
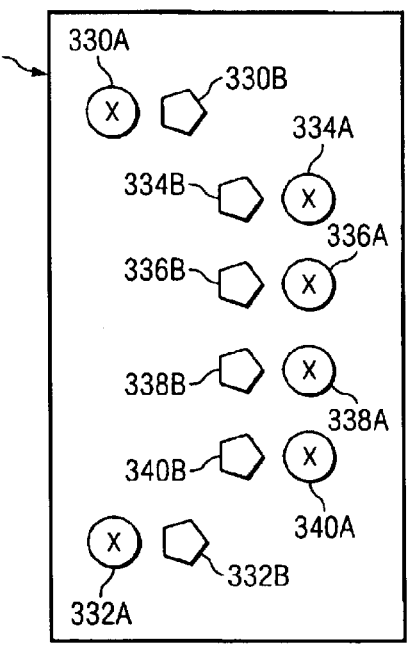

FIG. 16A shows a four wavelength filter module 320 which adds or drops individual wavelengths in the 1500 nm window designated λ1, λ2, λ3, λ4. A separate filter module 320 is used for transmit and receive functions. The filter module includes components 322, 324, 326, 328 each for adding or dropping a particular single wavelength in the 1500 nm window. The module includes common port 330, expansion port 332, and add or drop ports 334, 336, 338, 340. A physical view 320A of the interfaces to and from module 320 is shown in FIG. 16B. Interface designations correspond to ports in FIG. 16A. Electrical jack interfaces are shown in FIG. 16B with corresponding numbers followed by the letter "B". For example, the management interface for port 334 is designated 334B.

Figures 17A, 17B:
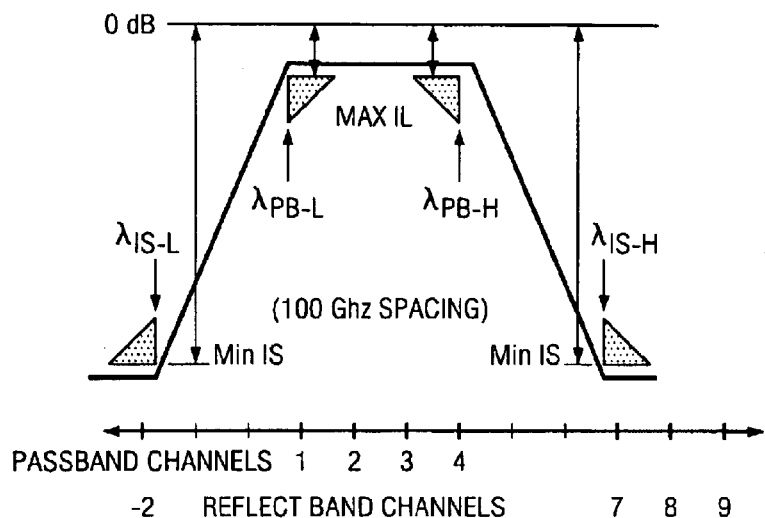
FIG. 17A shows a characteristic curve of the band module component of FIG. 14C.
FIG. 17B shows passband and corner point values associated with the characteristic curve of FIG. 17A.

The filter characteristics of a band module component of the type described above (components 268B, 268C in FIG. 14C) are shown in FIG. 17A for a four-channel band device. The wavelengths for the specified "corner points" depend on the particular defined band. FIG. 17B shows passband and corner point values for eight different bands A, B, C, D, E, F, G and H using 100 Ghz channel spacing. Typical insertion loss is 1.0 dB for passband channels on a passband port and 0.6 dB for reflect-band channels on a reflect-band port. Typical isolation is 30 dB for reflect-band channels on a passband port and 12 dB for passband channels on a reflect-band port.

The filter characteristics of a dual band module component of the type described above for components 264, 268 in FIG. 14A are shown in FIG. 18A for a ten-channel band device. FIG. 18B shows passband and corner point values for four different dual bands AB, BC, EF and FG using 100 Ghz channel spacing. Typical insertion loss is 1.6 dB for passband channels on a passband port and 0.6 dB for reflect-band channels on a reflect-band port. Typical isolation is 25 dB for reflect-band channels on a passband port and 11 dB for passband channels on a reflect-band port. While the description of embodiments refers to four and ten channel devices, it should be apparent that embodiments of band devices having other channel counts can also be provided.

Having described the optical module components, an example optical channel plan is now described. An optical channel plan can be used as the basis for planning, provisioning and deployment of WDM components in a network. As capacity needs increase in the network, the required number of lightpaths between any two nodes often can double. Selecting the correct channel plan can minimize interruption and waste associated with future additions to capacity. A channel plan can also support business models in which low cost infrastructure needs to be extended from a core network to add a very few new lightpaths.

Three low entry cost plans which can eliminate the need for optical amplifiers are defined in the following table.

| | | | Applications | | |
|---|---|---|---|---|---|
| Wavelength | Channel | Band | Small Ring or Mesh | Large Ring or Mesh | Hub |
| 1310 nm +/− 40 nm | | 1310 | adjacent connect | adjacent connect | adjacent connect |
| 1529.55 | 60 | A3 | growth | growth | growth |
| 1530.33 | 59 | A1 | N = even | N even, N +/− 4 | N +/− 2 |
| 1531.12 | 58 | A2 | growth | growth | growth |
| 1531.90 | 57 | A4 | growth or spare | growth or spare | growth or spare |
| 1532.68 | 56 | guard | | | |

-continued

| Wavelength | Channel | Band | Applications | | |
|---|---|---|---|---|---|
| | | | Small Ring or Mesh | Large Ring or Mesh | Hub |
| 1533.47 | 55 | guard | | | |
| 1534.25 | 54 | B3 | growth | growth | growth |
| 1535.04 | 53 | B1 | adjacent connect | N even, N +/− 2 | N +/− 1 |
| 1535.82 | 52 | B2 | growth | growth | growth |
| 1536.61 | 51 | B4 | growth or spare | growth or spare | growth or spare |
| 1537.40 | 50 | guard | | | |
| 1538.19 | 49 | guard | | | |
| 1538.98 | 48 | C3 | growth | growth | growth |
| 1539.77 | 47 | C1 | N = odd | N even, N +/− 4 | N +/− 3 |
| 1540.56 | 46 | C2 | growth | growth | growth |
| 1541.35 | 45 | C4 | growth or spare | growth or spare | growth or spare |
| 1542.14 | 44 | guard | | | |
| 1542.94 | 43 | guard | | | |
| 1543.73 | 42 | D3 | growth | growth | growth |
| 1544.53 | 41 | D1 | | H + 3 (hub) | N +/− 7 |
| 1545.32 | 40 | D2 | growth | growth | growth |
| 1546.12 | 39 | D4 | | growth or spare | growth or spare |
| 1546.92 | 38 | guard | | | |
| 1547.72 | 37 | guard | | | |
| 1548.51 | 36 | E4 | | growth or spare | growth or spare |
| 1549.32 | 35 | E3 | | growth | growth |
| 1550.12 | 34 | E1 | | N odd, N +/− 4 | N +/− 5 |
| 1550.92 | 33 | E2 | | growth | growth |
| 1551.72 | 32 | guard | | | |
| 1552.52 | 31 | guard | | | |
| 1553.33 | 30 | F4 | | growth or spare | growth or spare |
| 1554.13 | 29 | F3 | | growth | growth |
| 1554.94 | 28 | F1 | | N odd, N +/− 2 | N +/− 4 |
| 1555.75 | 27 | F2 | | growth | growth |
| 1556.55 | 26 | guard | | | |
| 1557.36 | 25 | guard | | | |
| 1558.17 | 24 | G4 | | growth or spare | growth or spare |
| 1558.98 | 23 | G3 | | growth | growth |
| 1559.79 | 22 | G1 | | N odd, N +/− 4 | N +/− 6 |
| 1560.61 | 21 | G2 | | growth | growth |
| 1561.42 | 20 | guard | | | |
| 1562.23 | 19 | guard | | | |
| 1563.05 | 18 | H4 | | growth or spare | |
| 1563.86 | 17 | H3 | | growth | |
| 1564.68 | 16 | H1 | | adjacent connect | |
| 1565.50 | 15 | H2 | | growth | |

The table shows "through path bands" A through H and ITU grid wavelengths for 100 Ghz spacing. It should be noted that the lightpaths deployed within a band can be 50 Ghz, 100 Ghz or 200 Ghz or other spacing. Use of 50 Ghz spaced transmitters doubles the growth capacity over what is shown and can be selectively deployed.

The channel plans (small mesh, large mesh and hub) are beneficial when the network traffic patterns require any one node to be connected to many other nodes which are not necessarily physically adjacent. This is also referred to as "high destination diversity" and includes optical bypassing for direct connection of non-adjacent nodes. The plans provision bands to establish mesh connectivity using a physical ring or linear network fiber topology. Four or more channels are provisioned at one time but only the needed lightpaths are "lit" based on transmission equipment as determined by current traffic needs. The other lightpaths are "pre-provisioned" for future use so that capacity expansion is accomplished without network interruption or retrofitting of prior installations.

The channel plan in the above table for small ring or mesh is applied in the configuration described previously with respect to FIG. 6. A deployment example is now described for a large mesh application for an 8 node, dual-fiber ring. Initially, each adjacent node is connected using 1310 nm, leaving the 1500 nm bands unlit. Because the growth plan is "large mesh", initial provisioning includes a single dual band component in the optical shelf at each node for add/drop capability as indicated in the following table wherein the nodes are numbered consecutively around the physical ring:

| Node number | Add/Drop component |
|---|---|
| 1,5 | DE |
| 2,6 | AB |
| 3,7 | EF |
| 4,8 | BC |

Based on the provisioning specified in the channel plan, the resulting mesh network is shown in FIG. 19. Adjacent connections are made using 1310 nm. Connections 402, 404, 406, 408, 410, 412 use corresponding optical bands E, D, B, A, F, C, respectively. Double connections between node pairs (1,5), (2,6), (3,7) and (4,8) are provided by diverse routing around the physical ring. It can be seen that the use of optical banding allows one node to communicate with multiple other nodes using a single banding elements. Each optical shelf has 2.2 dB insertion loss plus any connectors. The longest span bypasses 3 nodes with a total loss of only 6.6 dB. It should be apparent from the rich connectivity of this example that the present optical banding approach can be applied in a similar manner to an optical backplane.

While the particular embodiments described above relate to dual, adjacent overlapped bands, it should be apparent that the principles of the present approach can be applied to other embodiments in which other combinations of overlapped bands are used. For example, an alternate embodiment of an optical module can provide triple bands (e.g., bands ABC) or other sized bands. In turn, such a triple banded module can be used at one node to communicate with another node that has a single (e.g., B band) or dual band (e.g., BC) optical module using a lightpath common or overlapped (i.e., B band) between the bands of the two different modules.

Having described the optical banding of the present system and method, the management interface and optical management bus aspect is now described.

The foregoing describes optical modules which mount in an optical shelf that is typically located near active transmission equipment. As noted above, the optical shelf is foremost a mechanical support device which helps organize the network fibers and optical devices. It can be understood that in such an optical shelf, wavelengths can be separately added and dropped and lightpaths can be optically bypassed. In addition, network fibers can provide several attachment points which are indistinguishable to the attached equipment and a large number of branches are created on the network fibers by the WDM or other optical components. Each of these branching points are also indistinguishable to the attached equipment.

Since a large number of fiber patch cables connect between the optical components and the transmission equipment as described above in connection with FIG. 11, the actual configuration is not readily visible to typical network management systems. A known method used to configure or verify a configuration includes visually and manually inspecting each end of each cable and comparing that to a network plan. It is easy to see how such an approach can lead to misconfigurations and other problems. For example, an optical transmitter of the transmission equipment can be connected to several different points in the optical shelf while typically only one of these attachment points has the correct WDM component(s), is the correct port on the component, and is connected to the correct network fiber.

The typical optical shelf can encounter problems which can be difficult to diagnose and repair such as the following:

An optical transmitter is connected to a WDM component which does not pass the transmit wavelength reliably.

Optical transmitters and associated receivers are connected to an incorrect pair of fibers (they are often connected to different fibers but must be connected to specific different fibers).

Two optical transmitters are connected to the same network fiber when they should be connected to diversely routed fibers, meaning that fault protection is not provided.

An optical wavelength is incorrectly dropped at an optical shelf when it should pass through the optical shelf without interruption to another destination on the network.

Added components in a network upgrade can affect a preexisting lightpath, for instance a new add/drop multiplexor can inject too much insertion loss for a lightpath which continues past this node.

A lightpath of some wavelength can be added to a fiber with another signal of the same wavelength, disrupting the operation of one or both lightpaths. Without visibility into the configuration of multiple optical nodes at one time, it is very difficult to understand the desired operation. With a large number of cables concentrated at each point in the network, it is difficult to diagnose a configuration through only visual inspection.

Prior approaches to the above-noted problems include various management tools common to optical networks. One approach uses an optical supervisory channel (OSC) at 1–10 Mb/s data rate operated on a wavelength of 1625 nm, 1480 nm or, more recently, 1510 nm. The OSC is commonly used to manage optical amplifiers and send information between nodes on an optical network. One OSC is operated on a fiber and is associated with many lightpaths. However, the OSC is not useful to help track individual lightpaths that independently branch among multiple fibers and does not provide the configuration information needed.

Another approach uses an optical wavelength monitor which is a device capable of determining the signal presence and absence for many independent wavelengths on a particular fiber. Such devices are relatively expensive and have limited use, e.g., it can show a lightpath is active at the point of monitoring but does not provide configuration information. The information available is not directly useful to diagnose a configuration problem or to identify the source of an optical lightpath.

Another approach is to use an optical cross-connect switch which is an electrical switching device between a pair of WDMs. Any input wavelength can be switched to any output wavelength (in the absence of contention for output resources). This device provides full configuration information but at great expense. Each optical lightpath is terminated at each branchpoint, between fiber segments. Passive optical bypassing is not part of this approach despite being the most common configuration used with WDM today.

In the prior art, branching tree topologies with loops are typically accommodated using "bridging protocols" between multiple bus segments. IEEE 802.1 d Bridges with IEEE 802.3 CSMA/CD link and physical layer protocols can be used. However, the application of these many layers of protocol and technology would cause a significant increase in the cost and complexity of the optical modules which otherwise could be completely passive and without need for power or cooling.

Technologies called "I2C" and "One-Wire" are often used to collect or inventory the contents of a chassis. An approach common in other contexts is to put one such interface on each module to be "inventoried" and to provide an interconnection bus in the backplane of a rack-mount chassis holding said modules. There are shortcomings of that approach by itself. First, it is insufficient to know only the inventory of module types within a chassis since the connections between modules are user configured via patch cables and thereby determine the configuration. Second, the interconnections between these optical components form a highly branching tree structure with loops that is incompatible with simple bus protocols. I2C and One-Wire each require a linear topology without stubs and with few connections. Further, the order of connections between optical modules is required and this information is not available from nodes on a bus structure.

According to an aspect of the present method and system, a low cost approach is provided for collecting configuration and characterization information from components located in an optical shelf. The present approach allows the transmission equipment or another management agent access to the contents of the optical shelf and interconnections between components within the optical shelf. This approach provides a way to associate lightpaths originating within the transmission equipment with network fibers.

The present method and system break the branching tree of connections into a set of bus segments without loops or stubs which creates a low cost bus to provide network management visibility into the optical add/drop elements. In particular, electrical interconnects are provided that follow the optical lightpaths within an optical shelf to ascertain the associations of network fibers to the optical transmitters and receivers of transmission equipment. Also, the nature and sequence of connection for the intervening WDM couplers and other components in the optical path is collected. Information collected from the electrical interfaces in optical modules allows creation of a configuration map for each network fiber and its associated WDM and other optical modules.

It should be noted that in the following description of the optical management bus of the present system, the term "bus" refers to a linear or non-branching set of cable segments and does not include stubs or Y segments.

Figure 20:
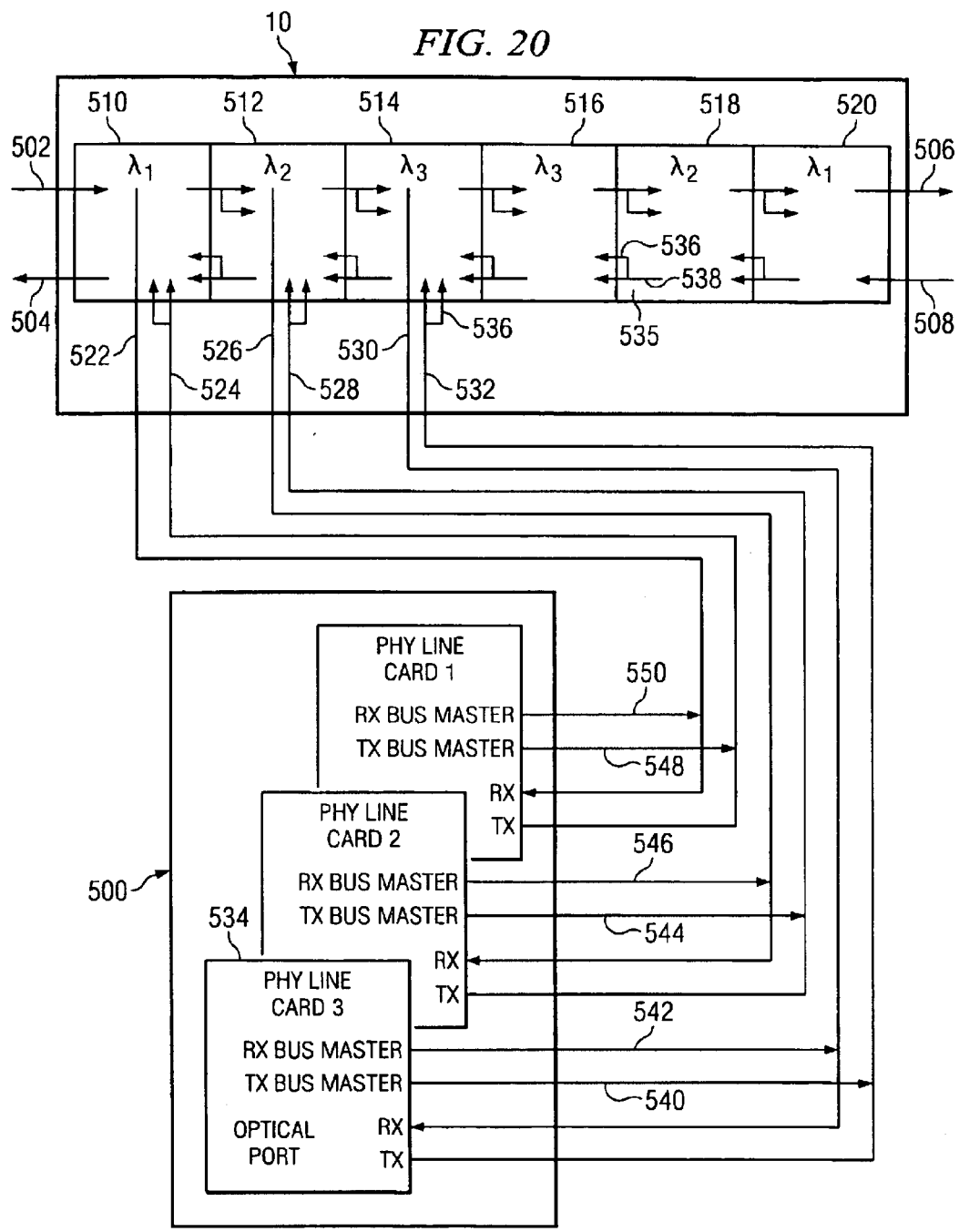
FIG. 20 shows a block diagram of interconnections within an optical shelf and between the optical shelf and transmission equipment.

The following describes the connections between optical modules in the optical shelf and the connections internal to the optical modules for the management interface. FIG. 20 shows a block diagram of an optical shelf 10 connected to transmission equipment 500. The optical shelf includes passive WDM components which for simplicity are shown as single wavelength filter modules 510, 512, 514, 516, 518, 520. It should be understood, however, that the principles of the optical management bus approach described herein apply also to use of the optical band modules described above.

Network fiber cables 502, 504 and 506, 508 connect the optical shelf to other network nodes. The optical modules within the optical shelf are interconnected with a hybrid cable 535 that includes an optical fiber 538 and a pair of electrical conductors 536. The hybrid cable has two plugs on each end, an optical and an electrical plug. The modules have a mating pair of recepticals for the hybrid cable at all connection points, the number of which are determined by the optical function.

A module which connects to a network fiber, e.g., module 510, is considered a root of an optical tree structure within the optical shelf 10. The network fibers 502, 504, 506, 508 do not normally include electrical conductors so this forms an endpoint to the configuration visibility provided by the present system. The root module serves to identify a network attachment point of special significance. It is important to identify which optical lightpaths are in which fibers. This is seen to be the set of lightpaths that pass through the WDM at the root of this optical tree. In this case, the wavelength filter module 510 normally is connected to a physical layer (PHY) line card 534 of the transmission equipment 500 which contains the optical interface for a lightpath as described below, thereby providing visibility to the optical path. However, if no additional optical connection is made to this module, then the next module in line serves as the root.

Hybrid patch cables having electrical conductors 536 are used to connect the optical modules to the transmission equipment 500. In the example configuration shown in FIG. 20, hybrid patch cables pairs (522, 524), (526, 528) and (530, 532) connect modules 510, 512 and 514 to PHY line cards 1, 2 and 3, respectively. The electrical path provided in the optical shelf is used to transfer data to bus master circuitry on the PHY line cards which each connect electrically to the hybrid cables on lines 540, 542, 544, 546, 548, 550, respectively.

Figure 21:
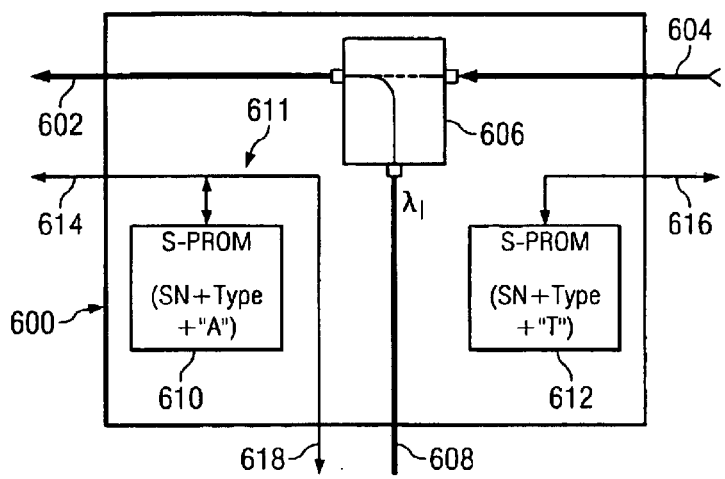
FIG. 21 illustrates an internal electrical interface configuration of an optical module.

Each optical module includes an internal electrical interface configuration as shown in FIG. 21 for an optical add or drop component 600. The component 600 includes three fiber interfaces 602, 604, 608. There is an electrical path connection 614, 616, 618 associated with each such fiber interface 602, 604, 608. The electrical path connections 614 and 618 are internally connected to form a single bus 611. The electrical connection 616 forms a separate bus. Each bus 611, 616 connects to a serial PROM (S-PROM) 610, 612 which includes a unique identifier for the module as well as module type and characterization information described further herein. The S-PROM also includes electrical circuitry for receiving and transmitting electrical signals on a serial bus. It should be noted that the electrical interfaces are only for management purposes and do not affect the primary optical function of the optical modules.

The S-PROMs include information about the specific connector port they are connected to, allowing a connection to one S-PROM to be distinguished from a second S-PROM. In this way, a connection to the add/drop path 608 of a module can be distinguished from a connection to the optical through path 604. The S-PROM includes the following information:

| S-PROM Entry | Characteristic | Usage |
| --- | --- | --- |
| Serial Number | globally unique number | identifies optical module |
| Type | function identity | specifies module function |
| Port | A or T depending on location; Tx or Rx depending on use | identifies intended use of connector port |

Figure 22:
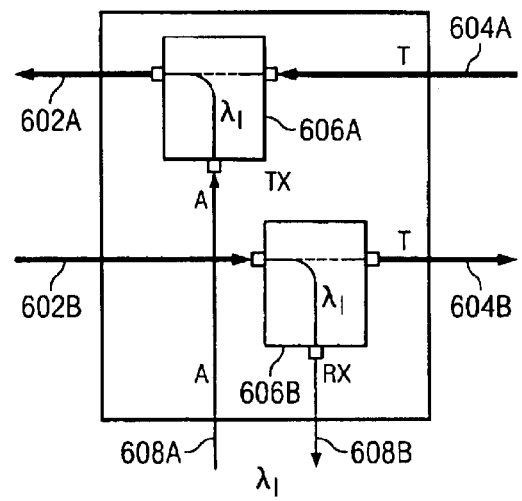
FIG. 22 illustrates transmit and receive port designations for an optical module.

Use of the "A" for (add/drop) and "T" (for through path) designations are illustrated in FIG. 21. The "Tx" and "Rx" designations are used in modules that include two qinstances of the circuitry of FIG. 21 for purposes of supporting a transmit and a receive function in a single optical module. Such a module is placed in the through path of the optical shelf in FIG. 20 to aid in the configuration of correct connections between the network fibers. An example of such a module is shown in FIG. 22. This module includes a total of four S-PROMs. The identifiers are assigned for each of four S-PROMs in the module as indicated by the letters A, T, TX and RX. Note that the electrical busses are not shown for simplicity but are associated with the optical ports as in FIG. 21.

The S-PROM can also include manufacturing information, such as a date code, and model revision information, such as the manufacturer of the individual components. Such information is useful to network management applications although ancillary to the principles of the present approach.

Figure 23:
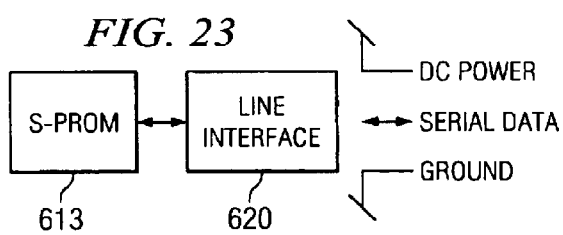
FIG. 23 illustrates an electrical slave interface for an S-PROM of an optical module.

The S-PROM further includes circuitry for providing remote access to the PROM data over a simple UART protocol. A representative part number is Dallas Semiconductor's DS2502, "1Kbit Add-Only Memory" for the 1-Wire product family. The electrical nature of the electrical interface of an optical module is shown in FIG. 23. This interface is called a slave interface because it does not initiate a data transfer. A result of this structure is that the media access control (MAC) protocol is very simple and determined by the bus master.

Additionally, an optical module interface contains a line interface 620 associated with S-PROM 613 that comprises any necessary voltage level translation or EMI filtering. Often, this function only includes a connector, a common mode choke and filter capacitors. The slave interface is powered by the bus itself to eliminate the need for a power supply in the optical shelf. The electrical interface includes power, labeled DC Power and Ground, which can have its own bus conductors. In an embodiment, the power is carried on the same conductors as the serial data.

Figure 24:
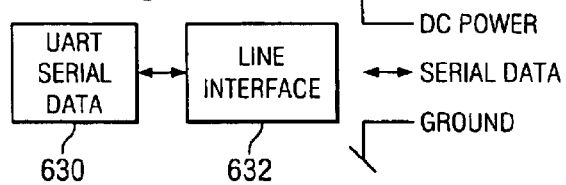
FIG. 24 illustrates an electrical master interface for a transmission equipment line card.

The PHY card 534 (FIG. 20) includes a master bus interface as shown in FIG. 24. A simple UART 630 protocol is used to communicate to the slave devices. The bus master uses an appropriate means to select one of the slave devices to read the S-PROM and thus learn the identity of each module on the bus. Not shown is a microprocessor which operates the UART and compiles information collected from the optical shelf management bus. Note that a particular configuration has one instance of the master interface for each optical transmitter and receiver. There can be several PHY interfaces in the transmission equipment connecting into an optical shelf as shown in FIG. 20. The line interface circuitry 632 is the same as for the slave interface of FIG. 23. The bus master supplies power to the slave interfaces via the data bus.

The data in the S-PROMs is collected via the electrical path in the optical patch cable and the UART 630 on each PHY line card 534. The collected information can be compiled into a map of the optical interconnections in the lightpath between the PHY card and the network fiber.

Figure 25:
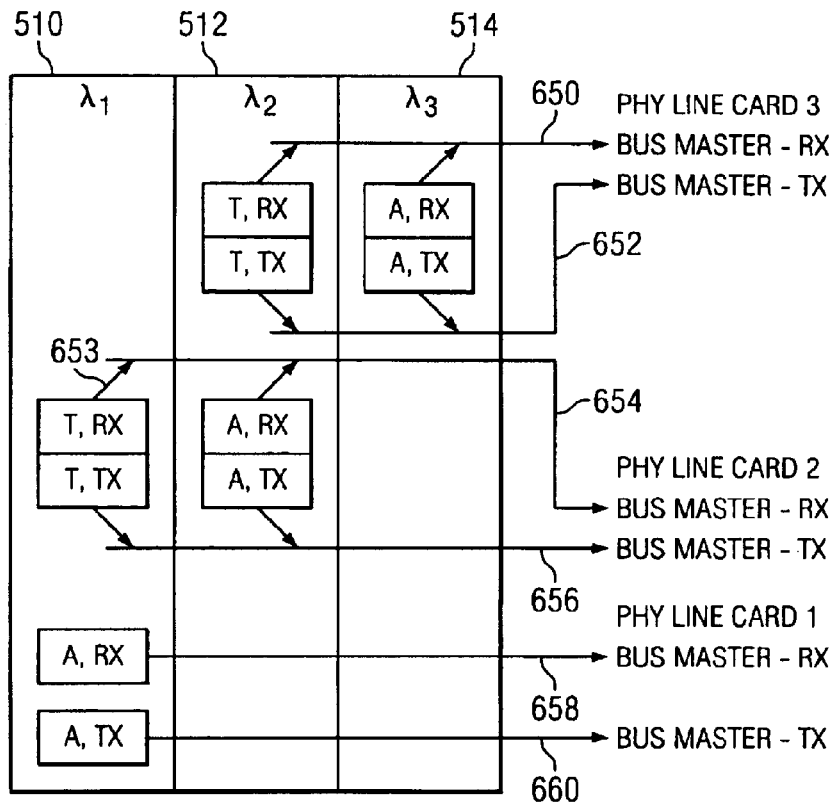
FIG. 25 illustrates a schematic block diagram of interconnected optical modules and transmission equipment.

FIG. 25 shows schematically how the interconnection optical modules 510, 512, 514 using the hybrid patch cables result in multiple electrical busses 650, 652, 654, 656, 658, 660 that follow the branching optical tree. Each arrow 653 indicates a location where an electrical connection to a module occurs. Note that each bus will be without branches or stubs that could otherwise disrupt a data transmission protocol with reflections or capacitive loading. The multiple electrical busses are associated as branches of a single optical tree using the unique module identifiers contained in the S-PROMs. Also shown are the values (A, T, Rx, Tx) of the port information that varies according to port type for each S-PROM in the optical modules that can be used to create a complete map of the optical shelf.

As shown in FIG. 25, the electrical busses 658, 660 extend all the way to the network fiber 502, 504 (FIG. 20). The optical module 510 can be identified as the root for this optical tree, effectively identifying a unique identifier for this endpoint of a network fiber and useful for describing a group of wavelengths which share a fiber.

An individual electrical bus does not always extend all the way to the beginning of the network fiber, but can terminate instead at the point where the optical path becomes part of the "through path". This is to eliminate the need for stubs on the electrical bus. At this termination point, a module can be identified which is closer to the root module or is the root module. In FIG. 25 this can be seen for the bus associated with PHY line card 2 RX.

Figure 26:
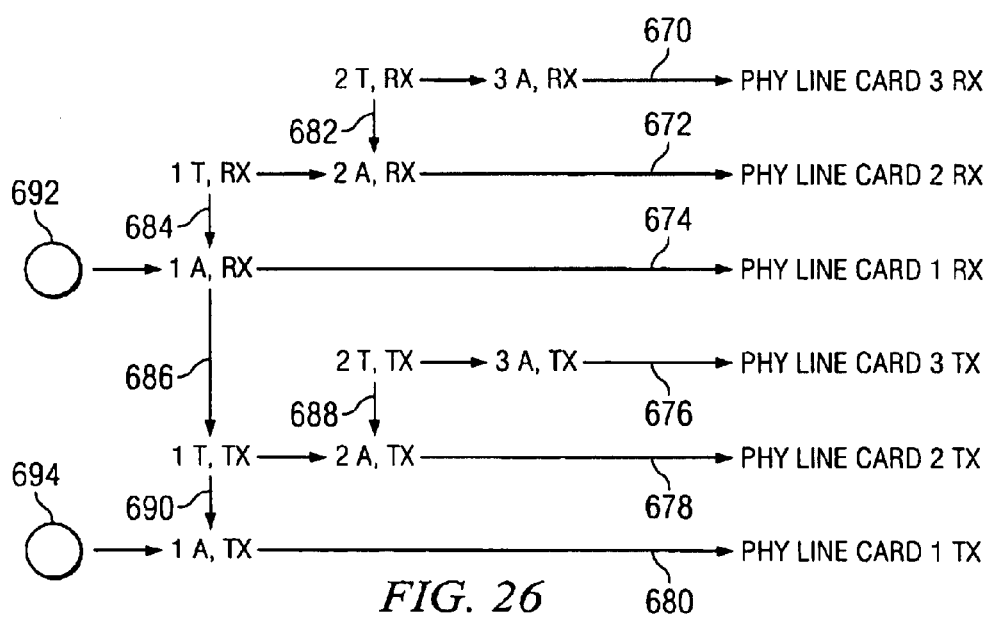
FIG. 26 illustrates a mapping of optical interconnections for the arrangement of FIG. 25.

A map of the optical interconnections can be constructed using the data collected via the electrical busses in FIG. 25. The associations that allow construction of this map are highlighted in FIG. 26. The entries shown are for each of the PHY interfaces and are of the format: Module identifier, Port type. The horizontal lines indicate associations of data collected on an individual electrical bus. For example, the top line 670 indicates the data collected using the bus 650 (FIG. 25) of PHY Line Card 3, RX. The vertical lines indicate associations made based on the serial number identifiers in the collected data. For instance, the three vertical lines 684, 686, 690 that join entries for module 1 (element 510 in FIG. 20).

Two circles 692, 694 on the left side of the entry for module 1 indicate the aforementioned special characteristic of the root of the optical network—an add path identifier without another associated module id. The entries of type A (add path) otherwise have one or more horizontally associated entries. An entry of type T (through path) always indicates the end of an electrical bus and terminates a string of horizontal entries. These facts allow the order of modules in the optical bus to be ascertained. For instance, it can be seen that module 1 (510 FIG. 20) connects directly to module 2 (512 FIG. 20) and indirectly to module 3 (514 FIG. 20), so that the order of the optical modules on the optical tree is known. It can also be seen that transmit and receive busses can be associated by tracing their respective paths up to module 1. This allow verification that the individual fibers used by the transmit and receive functions are correct.

Note that the correct connection of a WDM transmitter to an appropriate wavelength WDM optical device can also be verified. Within the optical module S-PROM, additional information can be included pertaining to the function (such as wavelength or other functional type). A management application only needs to be supplied with a matrix of appropriate connections to be used in a verification process.

Additional configuration verifications related to transmitters, receivers, and optical links spanning multiple network nodes can be provided using the principles of the present optical management bus approach. For instance, the wavelength being dropped to a wideband receiver module can be verified to be correct. Also, the information related to a remote transmitter can be compared to the function of a WDM in the optical shelf to verify that the intended lightpath is dropped and connected to the intended receiver module. Further, the information collected from several optical shelves can be used to verify that an optical link spanning many nodes is in the same configuration as recorded previously or the current inventory of parts matches a plan used for installation. Other purposes for using the collected information include associating nodes across a network knowing that a particular optical band (e.g., band B) and 1300 nm connections are being used between adjacent network nodes. Optical monitor ports can also be applied to the modules illustrating the application of the optical management bus; however, these are not shown since they are not part of the optical topology being mapped for network management.

While the above description has focused on passive optical devices, it should be understood that the principles of the present system and method for optical management also apply to other non-passive optical devices such as an Erbium Doped Fiber Amplifier (EDFA).

While this system and method have been particularly shown and described with references to particular embodiments thereof, it will be understood by those skilled in the art that various changes in form and details may be made therein without departing from the scope of the invention encompassed by the appended claims.

What is claimed is:

1. An optical module comprising:

an add/drop optical component for adding or dropping an optical channel to or from an optical signal;

a common optical path coupled to the add/drop optical component for carrying at least a first and a second optical channel;

an add/drop optical path coupled to the add/drop component for carrying at least the first optical channel;

a through optical path coupled to the add/drop component for carrying at least the second optical channel;

a first electrical path associated with the common optical path;

a second electrical path associated with the add/drop optical path and interconnected to the first electrical path;

a third electrical path associated with the through optical path;

a first data device storing first module information and a line transceiver coupled to the first data device for communicating the first module information over the first and second electrical paths; and a second data device storing second module information and a line transceiver coupled to the second data device for communicating the second module information over the third electrical path.

2. The optical module of claim 1 wherein the first and second module information each includes a unique module identifier, module function identifier and a module port identifier and wherein the first module identifier and the second module identifier are the same.

3. The optical module of claim 1 wherein the second and third electrical paths are connected to a leaf node in a tree that includes a bus master for receiving the first and second module information.

4. A communication node comprising:

an optical shelf comprising at least one optical module having plural optical paths, each optical path having an electrical path associated therewith, wherein the optical module includes a first data device storing first module information and a line transceiver coupled to the first data device for communicating the first module information over first and second interconnected electrical paths;

transmission equipment comprising at least one line card having an optical transmitter, an optical receiver, an electrical transmit bus master and an electrical receive bus master;

at least one hybrid optical/electrical cable interconnecting the at least one line card to the at least one optical module such that the hybrid optical/electrical cable interconnects at least one of the plural electrical paths to provide at least one electrical transmit bus coupled to the electrical transmit bus master and to provide at least one electrical receive bus coupled to the electrical receive bus master; and a second data device storing second module information and a line transceiver coupled to the second data device for communicating the second module information over a third electrical path.

5. The communication node of claim 4 wherein the first and second module information each includes a module identifier and wherein the first module identifier and the second module identifier are the same.

6. The communication node of claim 5 wherein the optical shelf comprises plural interconnected optical modules and wherein the transmission equipment includes means for collecting the module information from each optical module over the electrical transmit bus and the electrical receive bus for determining a map of optical interconnections in the node.

7. The communication node of claim 6 wherein the module information includes module function identifier and module port identifier which allows the order of interconnected optical modules to be determined.

8. A communication node that comprises:

an optical shelf comprising at least one optical module having plural optical paths, each optical path having an electrical path associated therewith, transmission equipment comprising at least one line card having an optical transmitter, an optical receiver, an electrical transmit bus master and an electrical receive bus master;

at least one hybrid optical/electrical cable interconnecting the at least one line card to the at least one optical module such that the hybrid optical/electrical cable interconnects at least one of the plural electrical paths to provide at least one electrical transmit bus coupled to the electrical transmit bus master and to provide at least one electrical receive bus coupled to the electrical receive bus master; and wherein the optical module further comprises:

an add/drop optical component for adding or dropping an optical channel to or from an optical signal;

a common optical path coupled to the add/drop optical component for carrying at least a first and a second optical channel;

an add/drop optical path coupled to the add/drop component for carrying at least the first optical channel;

a through optical path coupled to the add/drop component for carrying at least the second optical channel;

a first electrical path associated with the common optical path;

a second electrical path associated with the add/drop optical path and interconnected to the first electrical path;

a third electrical path associated with the through optical path;

a first data device storing first module information and a line transceiver coupled to the device for communicating the first module information over the interconnected first and second electrical paths; and a second data device storing second module information and a line transceiver coupled to the device for communicating the second module information over the third electrical path.

9. A communication node in a communication system having plural nodes interconnected by an optical transmission medium carrying plural bands of optical channels, the communication node comprising:

an optical shelf comprising at least one optical module having plural optical paths, each optical path having an electrical path associated therewith, the optical module comprising a demultiplexer for dropping one or more bands associated therewith, a multiplexer for adding one or more bands, the demultiplexer and multiplexer passively transmitting other hands;

transmission equipment including an optical transmitter, an optical receiver, an electrical transmit bus master and an electrical receive bus master; and a cable interconnecting the optical transmitter and optical receiver to the at least one optical module such that the cable interconnects at least one of the electrical paths to provide at least one electrical transmit bus coupled to the electrical transmit bus master and to provide at least one electrical receive bus coupled to the electrical receive bus master; and wherein the optical module includes a first data device storing first module information and a line transceiver coupled to the first data device for communicating the first module information over first and second interconnected electrical paths; and a second data device storing second module information and a line transceiver coupled to the second data device for communicating the second module information over a third electrical path wherein the first and second module information each includes a module identifier and wherein the first module identifier and the second module identifier are the same.

10. The communication node of claim 9 wherein the optical shelf comprises plural interconnected optical modules and wherein the transmission equipment includes means for collecting the module information from each optical module over the electrical transmit bus and the electrical receive bus for determining a map of optical interconnections in the node.

11. The communication node of claim 9 wherein the node can communicate with another node directly using a band common to the respective bands associated therewith.

* * * * *